US012413528B2

(12) United States Patent
Gelman et al.

(10) Patent No.: US 12,413,528 B2
(45) Date of Patent: Sep. 9, 2025

(54) COMPUTER-BASED SYSTEMS FOR AN INTELLIGENT IDENTIFICATION OF COMPUTING SERVICES AND CATEGORIES OF SERVICES IN USE WITHIN A PLURALITY OF COMPUTING NETWORKS AND METHODS OF USE THEREOF

(71) Applicant: SECURING SAM LTD., Tel Aviv-Jaffa (IL)

(72) Inventors: Alex Gelman, Tel Aviv (IL); Adam Fershtman, Tel Aviv (IL); Yaron Benita, Tel Aviv (IL); Jeff Holleran, Tel Aviv (IL); Erez Yehezkel, Tel Aviv (IL); Artium Acheldaev, Tel Aviv (IL); Roni Rosen, Tel Aviv (IL); Nadav Liebermann, Tel Aviv (IL)

(73) Assignee: SECURING SAM LTD., Tel Aviv-Jaffa (IL)

( * ) Notice: Subject to any disclaimer, the term of this patent is extended or adjusted under 35 U.S.C. 154(b) by 0 days.

(21) Appl. No.: 18/404,066

(22) Filed: Jan. 4, 2024

(65) Prior Publication Data
US 2024/0259320 A1 Aug. 1, 2024

Related U.S. Application Data

(60) Provisional application No. 63/478,422, filed on Jan. 4, 2023.

(51) Int. Cl.
*H04L 47/2408* (2022.01)
*H04L 41/046* (2022.01)
(Continued)

(52) U.S. Cl.
CPC ........ *H04L 47/2408* (2013.01); *H04L 41/046* (2013.01); *H04L 61/4511* (2022.05); *H04L 61/457* (2022.05)

(58) Field of Classification Search
CPC .............. H04L 47/2408; H04L 61/457; H04L 61/4511; H04L 41/046
See application file for complete search history.

(56) References Cited

U.S. PATENT DOCUMENTS

| 7,406,057 | B2 * | 7/2008 | Isomaki | H04L 47/20 370/401 |
| 2004/0204063 | A1 * | 10/2004 | Van Erlach | H04L 67/52 455/556.1 |

(Continued)

OTHER PUBLICATIONS

International Search Report and Written Opinion from International Application No. PCT/IB2024/000044 dated Aug. 7, 2024.

*Primary Examiner* — Minh Chau Nguyen
(74) *Attorney, Agent, or Firm* — GREENBERG TRAURIG, LLP

(57) ABSTRACT

A system and accompanying methods for providing intelligent identification of computing services and categories of services in use within a plurality of computing networks. The system analyzes network traffic associated with services requested by computing devices interacting with a network device, such as a network device of an internet service provider. The system compares the network traffic to information from a service identification list to determine a type of the service and/or a category of the service. The system provides an identification of the services and/or categories of the service to a service provider associated with the network device. Services tailored for the service and/or category of service can be provided to the computing devices, such as via the network device associated with the service provider.

19 Claims, 25 Drawing Sheets

(51) Int. Cl.
*H04L 61/45* (2022.01)
*H04L 61/4511* (2022.01)

(56) References Cited

U.S. PATENT DOCUMENTS

2012/0054363 A1* 3/2012 Hart .................. H04L 12/66
709/232
2018/0350180 A1* 12/2018 Onischuk ............... G07C 13/00

* cited by examiner

Table

| Series 1 | Timestamp | Measure Value |
|---|---|---|
| Dimension router_id: 3fd85f64-5717-4562-b3fc-2c963f66dfd6<br>Dimension device_id: 95:0d:d6:36:24:5d<br>Dimension service:45<br>Measure name: tx | 2019-02-18 8:01 PST | 1770 |
| | 2019-02-18 8:02 PST | 1780 |
| Dimension router_id: 3fd85f64-5717-4562-b3fc-2c963f66dfd6<br>Dimension device_id: 95:0d:d6:36:24:5d<br>Dimension service:45<br>Measure name: RxBytes | 2019-02-18 8:01 PST | 550 |
| | 2019-02-18 8:02 PST | 400 |

| Series 2 | Timestamp | Measure Value |
|---|---|---|
| Dimension router_id: 3fd85f64-8765-4562-b3fc-2c456f66cd45<br>Dimension device_id: 95:0d:d6:36:15:bf<br>Dimension service:45<br>Measure name: TxBytes | 2019-02-18 8:01 PST | 2670 |
| | 2019-02-18 8:02 PST | 10680 |
| Dimension router_id: 3fd85f64-8765-4562-b3fc-2c456f66cd45<br>Dimension device_id: 95:0d:d6:36:15:bf<br>Dimension service:45<br>Measure name: RxBytes | 2019-02-18 8:01 PST | 2308 |
| | 2019-02-18 8:02 PST | 7634 |

FIG. 13

```
1  -- Get the 10 most recently added data points in the past 15 minutes. You can change the time period if you're t
2  SELECT * FROM "sam-demo-service-id"."service_id" WHERE time between ago(15m) and now() ORDER BY time DESC LIMIT
3
4  -- Find the daily count tx rx for service in specific device and router for the past week
5  SELECT bin(time, 1d) as binned_time,
6      router_id,
7      device_id,
8      Service_Category,measure_name,
9      SUM(measure_value::bigint) as measure_value
10 FROM "sam-demo-service-id".service_id
11 WHERE time >= ago(7d)
12 GROUP BY router_id, device_id,Service_Category,measure_name, bin(time, 1d)
13 order by Service_Category
14
15
16
```

| binned_time | router_id | device_id | service_id | measure_name | measure_value |
|---|---|---|---|---|---|
| 2022-07-18 00:00:00.000000000 | 8d4311bc166048728eab4e07f6c2fcf4 | 68:2f:67:90:33:99 | Amazon | RxBytes | 1660875 |
| 2022-07-18 00:00:00.000000000 | 8d4311bc166048728eab4e07f6c2fcf4 | 68:2f:67:90:33:99 | Amazon | TxBytes | 3758710 |
| 2022-07-18 00:00:00.000000000 | 8d4311bc166048728eab4e07f6c2fcf4 | 68:2f:67:90:33:99 | Amazonaws | TxBytes | 27120 |
| 2022-07-23 00:00:00.000000000 | 8d4311bc166048728eab4e07f6c2fcf4 | 68:2f:67:90:33:99 | Amazonaws | RxBytes | 18106 |
| 2022-07-23 00:00:00.000000000 | 4e88048ba5184b10bd0ded221df3a332 | 36:a6:4f:56:eb:48 | Bing | RxBytes | 48823 |
| 2022-07-23 00:00:00.000000000 | 4e88048ba5184b10bd0ded221df3a332 | 36:a6:4f:56:eb:48 | Bing | RxBytes | 73156 |
| 2022-07-18 00:00:00.000000000 | 4e88048ba5184b10bd0ded221df3a332 | 36:a6:4f:56:eb:48 | Bing | TxBytes | 6155 |
| 2022-07-23 00:00:00.000000000 | 4e88048ba5184b10bd0ded221df3a332 | 36:a6:4f:56:eb:48 | Bing | TxBytes | 4142 |
| 2022-07-18 00:00:00.000000000 | 4e88048ba5184b10bd0ded221df3a332 | 36:a6:4f:56:eb:48 | Duckduckgo | TxBytes | 7748 |
| 2022-07-23 00:00:00.000000000 | 4e88048ba5184b10bd0ded221df3a332 | 36:a6:4f:56:eb:48 | Duckduckgo | TxBytes | 3924 |

| Traffic % (based on total entries) | #Domains | #Fnmatch domains |
|---|---|---|
| 99.5% | 450,000 | |
| 99% | 190,000 | |
| 95% | 12,500 | 3,750 |
| 90% | 2,800 | 1003 |
| 85% | 1,400 | 450 |

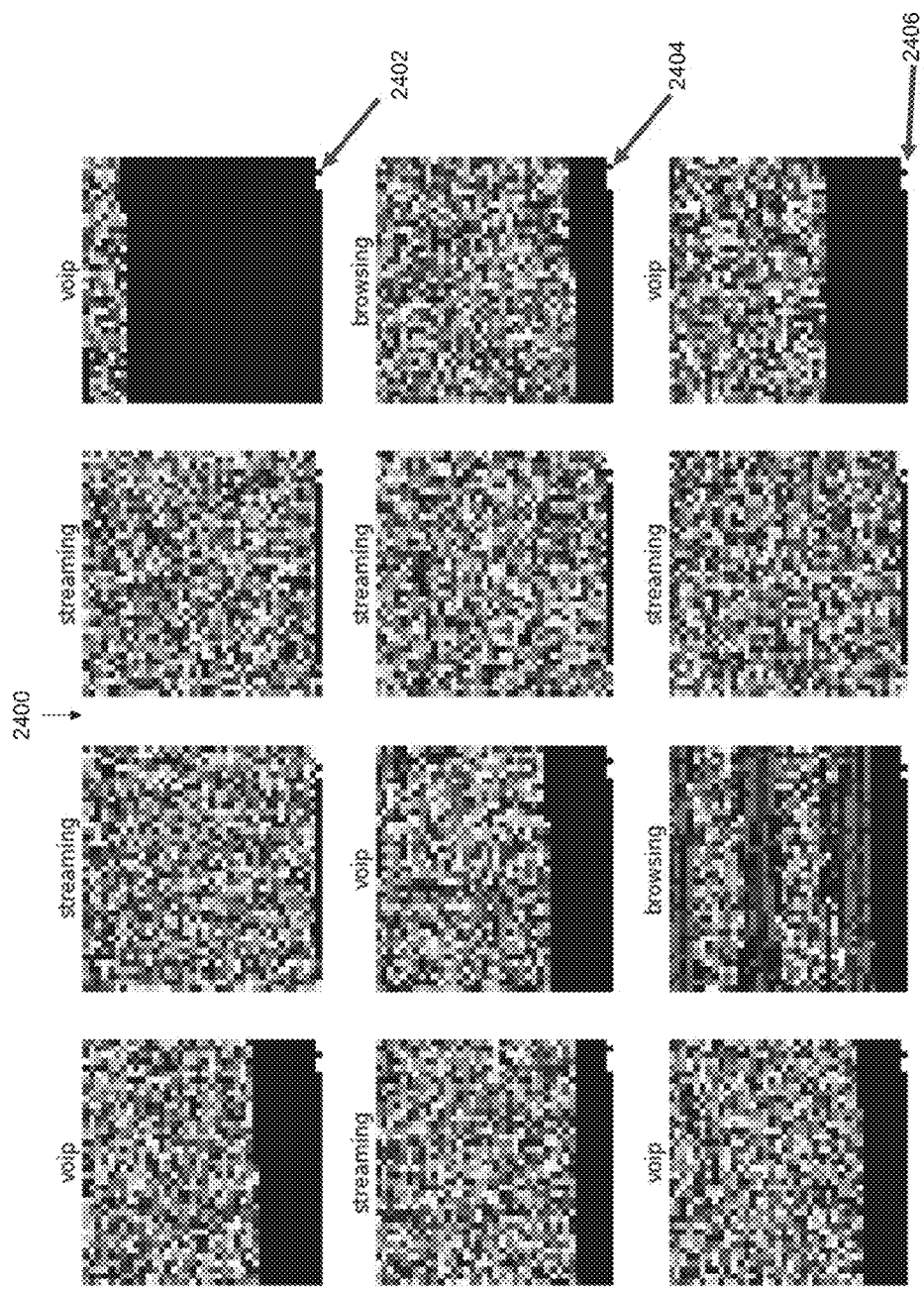

COMPUTER-BASED SYSTEMS FOR AN INTELLIGENT IDENTIFICATION OF COMPUTING SERVICES AND CATEGORIES OF SERVICES IN USE WITHIN A PLURALITY OF COMPUTING NETWORKS AND METHODS OF USE THEREOF

CROSS-REFERENCE TO RELATED APPLICATIONS

The present application claims prior to and the benefit of U.S. Provisional Patent Application No. 63/478,422, filed on Jan. 4, 2023, the entirety of which is hereby incorporated by reference.

FIELD OF TECHNOLOGY

The present disclosure generally relates to computer-based systems, and more specifically to computer-based systems for an intelligent identification of computing services and/or categories of services in use within a plurality of computing networks and methods of use thereof.

BACKGROUND OF TECHNOLOGY

A computer network platform/system may include a group of computers (e.g., clients, servers, routers and other computing hardware devices) that are linked together through one or more communication channels to facilitate communication and/or resource-sharing among a wide range of users.

SUMMARY

A system for providing intelligent identification of computing services and categories of services in use within a plurality of computing networks is provided. In certain embodiments, the system can include a backend server configured to control one or more agents configured to perform operative functionality of the system. The system can include a network device in communication with the backend server that is configured to perform a variety of operations and functionality of the system. In certain embodiments, for example, the network device can be configured to analyze, by utilizing the one or more agents, network traffic associated with one or more services requested by one or more devices in communication with the network device. In certain embodiments, the network device can be configured to compare, by utilizing the one or more agents, the network traffic associated with the one or more services to a service identification list provided by the backend server. In certain embodiments, the network device can be configured to determine, based on comparing the network traffic to the service identification list, a type of the one or more services, a category for the one or more services, or a combination thereof. In certain embodiments, the network device can be configured to provide, by utilizing the one or more agents, an identification of the type of the one or more services, the category for the one or more services, or a combination thereof, to a service provider associated with the network device. The network device can be further configured to provide, via the service provider and to the one or more devices, network services corresponding to the type of the one or more services, the category for the one or more services, or a combination thereof.

In certain embodiments, the network device can be further configured to compare the network traffic associated with the one or more services requested by the one or more devices to the service identification list by comparing first domain name service information associated with the network traffic to second domain name service information from the service identification list. In certain embodiments, the network device can be further configured to generate a digital file comprising an identification of delta domain names in the first domain name service information that are not in the second domain name service information of the service identification list. In certain embodiments, the network device can be further configured to identify one or more parameters for one or more services associated with the delta domain names. In certain embodiments, the network device can be further configured to identify a top-level domain associated with the delta domain names by executing a matching algorithm using the delta domain names.

In certain embodiments, the network device can be further configured to, based on the one or more services associated with the delta domain names being determined to exist, add the delta domain names associated with the one or more services to the service identification list. In certain embodiments, the network device can be further configured to create, based on the one or more services associated with the delta domain names being determined to not exist, the one or more services to provide one or more created services for inclusion in the service identification list. In certain embodiments, the network device can be further configured to determine, by utilizing a classification service, one or more categories for the one or more created services. In certain embodiments, the network device can be further configured to generate a plurality of parameters for the one or more created services. The plurality of parameters, for example, can include a service identification, a name, a digital icon, and the at least one category for the one or more created services. In certain embodiments, the network device can be further configured to provide the plurality of parameters to the backend server to update the service identification list to include the one or more created services and the plurality of parameters.

A network device for providing intelligent identification of computing services and categories of services in use within a plurality of computing networks is also provided. The network device can include a memory that stores instructions and a processor that is configured to execute the instructions to cause the processor to be configured to perform a variety of operations. In certain embodiments, the processor can be configured to inspect, by utilizing one or more agents, network traffic associated with one or more services requested by one or more devices in communication with the network device. In certain embodiments, the processor can be configured to compare, by utilizing the one or more agents, the network traffic associated with the one or more services to a service identification list provided by a backend server in communication with the network device. In certain embodiments, the processor can be configured to determine, based on comparing the network traffic to the service identification list, a type of the one or more services, a category for the one or more services, or a combination thereof. In certain embodiments, the processor can be configured to provide, by utilizing the one or more agents, an identification of the type of the one or more services, the category for the one or more services, or a combination thereof, to a service provider associated with the network device. In certain embodiments, the network device can be configured to provision, via the service provider and to the one or more devices, network services corresponding to the type of the one or more services, the category for the one or more services, or a combination thereof.

In certain embodiments, the processor can be further configured to identify a type of the one or more devices in communication with the network device that generated the network traffic. In certain embodiments, the processor can be further configured to determine one or more output metrics of the one or more services based on a pattern associated with data in the network traffic. In certain embodiments, the processor can be further configured to provide the one or more output metrics to a service provider to modify a parameter for the network services in accordance with the pattern. In certain embodiments, the processor can be further configured to identify the type of the one or more services, the category of the one or more services, or a combination thereof, based on a mapping of a pattern associated with data in the network traffic to the type of the one or more services, the category of the one or more services, or a combination thereof, provided by the service identification list. In certain embodiments, the processor can be further configured to identify the type of the one or more services, the category of the one or more services, or a combination thereof, based on examination of a packet payload of one or more packets associated with the network traffic.

A method for providing intelligent identification of computing services and categories of services in use within a plurality of computing networks is also provided. In certain embodiments, the method can include analyzing, by utilizing one or more agents executed based on instructions from a memory that are executed by a processor, network traffic associated with one or more services requested by one or more devices. In certain embodiments, the method can include comparing, by utilizing the one or more agents, the network traffic associated with the one or more services to a service identification list. In certain embodiments, the method can include determining, based on comparing the network traffic to the service identification list, a type of the one or more services, a category for the one or more services, or a combination thereof. In certain embodiments, the method can include transmitting, by utilizing the one or more agents, an identification of the type of the one or more services, the category for the one or more services, or a combination thereof, to a service provider associated with the one or more devices. In certain embodiments, the method can include providing, via the service provider and to the one or more devices, network services corresponding to the type of the one or more services, the category for the one or more services, or a combination thereof.

In certain embodiments, the method can include generating one or more images, one or more strings, and/or one or more converted data converted from one or more encrypted data payloads associated with one or more data packets of the network traffic. In certain embodiments, the method can include determining the type of the one or more services, the category of the one or more services, or a combination thereof, based on a first pattern associated with the one or more images, the one or more string, and/or the one or more converted data matching a second pattern classified for the type, the category, or a combination thereof.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

The Figures show one or more schematic flow diagrams, certain computer-based architectures, and/or screenshots of various specialized graphical user interfaces which are illustrative of some exemplary aspects of at least some embodiments of the present disclosure.

FIG. 12 is a table of the retrieved data for storage in accordance with embodiments of the present disclosure;

FIG. 13 is an exemplary query sample script in accordance with embodiments of the present disclosure;

FIG. 14 is a table of data generated using the query script of FIG. 13 in accordance with embodiments of the present disclosure;

FIG. 18 is an exemplary encrypted payload for a TLSv1.2 packet in accordance with embodiments of the present disclosure;

FIG. 22 illustrates a table showing data traffic versus unique domain count in accordance with embodiments of the present disclosure;

FIG. 24 illustrates a series of gray scale images converted from encrypted application data payloads for different services categories as inputs into a machine learning model in accordance with embodiments of the present disclosure.

DETAILED DESCRIPTION

Figure 1:
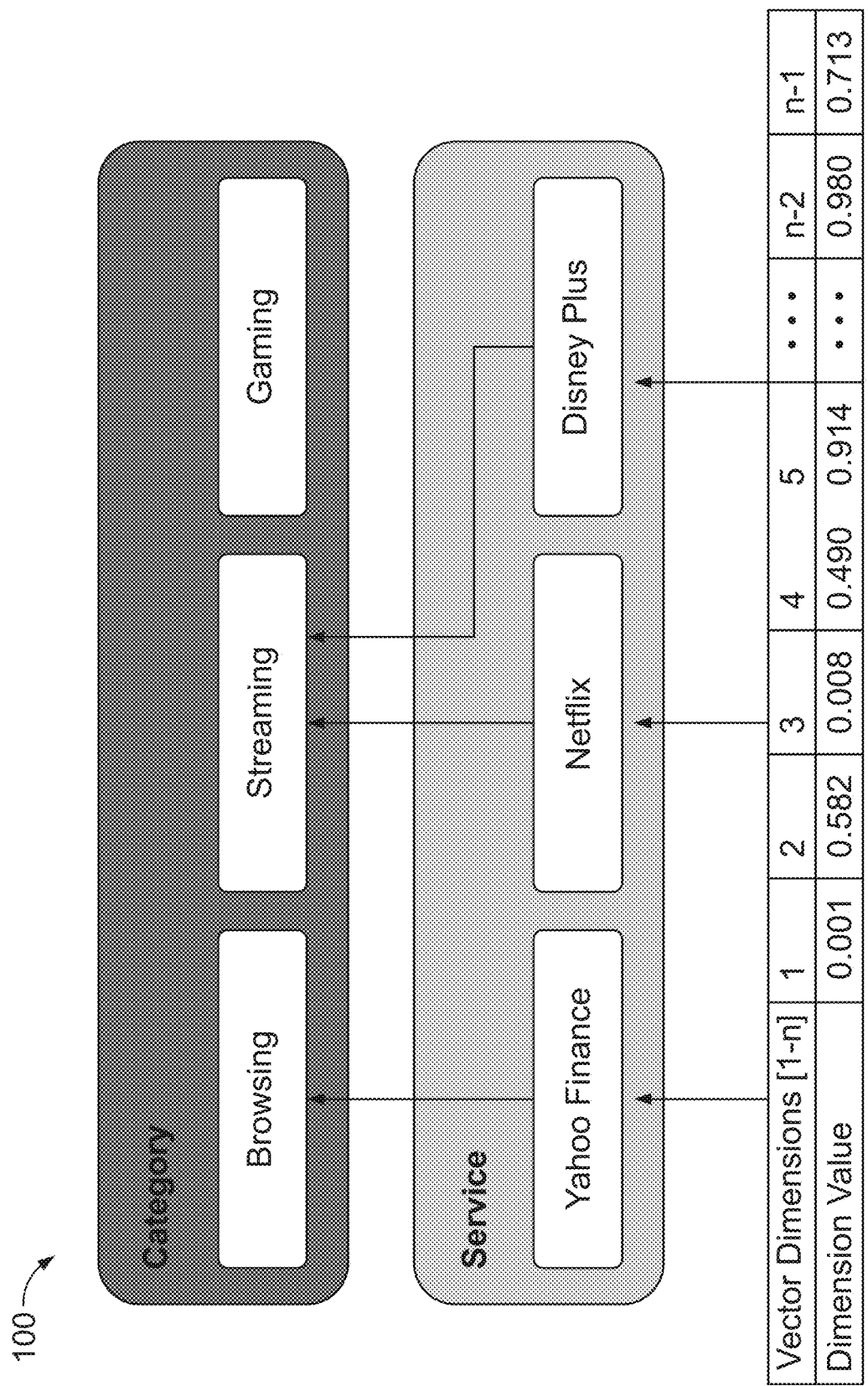
FIG. 1 is a diagram showing a mapping of data and/or data patterns in data traffic analyzed by service identification software into a data service and data service category in accordance with embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one 0" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein describe computer-based systems for an intelligent identification of computing services and/or categories of services in use within a plurality of computing networks and methods of use thereof. A service identification software may be deployed, for example, as a software agent and/or firmware in a plurality of networking devices operating within a plurality of computing networks that may be associated with a respective plurality of users. The plurality of users may include at least one Internet service provider (ISP), internet gateway, and/or router provider and their customers, for example. The plurality of networking devices may include, for example, but not limited to routers, switches and/or modulators.

Note that the terms service identification software, service identification software agent and service identification engine may all be used interchangeably herein.

In some embodiments, each of the routers, switches and/or modulators may include a controller unit, and a memory for storing the computer code for the service identification software.

In some embodiments, each of the software agents running the service identification software may be controlled through a communication network by a backend server (e.g., SAM backend server in the SAM computing cloud) associated with an entity that provides and manages the service identification software agent (e.g., SAM Seamless Networks, Tel Aviv, Israel).

In some embodiments, the service identification software may be configured to determine the different services used by computing devices at a particular location and to provide service usage information from the service ID agent to an ISP, for example. Suppose that an ISP may provide networking services to a particular network at a particular location via a particular router. At that location, a first person may be using an online conference software such as Zoom to participate in an online video conference meeting, a second person may be watching streaming channels such as Netflix and a third person may be downloading files, all on separate computing devices communicating with the particular router/For Zoom, high bandwidth and low latency is critical, downloading a file requires a lot of bandwidth but latency is not critical, and for streaming channels neither large bandwidth nor latency is critical since the data packets may be buffered during streaming. However, this scenario may still result in a critical application such as Zoom for remote workers, not getting enough bandwidth at a given location. The ISP, in having this service usage information, may be able to prioritize services supplied to its customers. For example, the ISP may prioritize the data pipelines to Zoom at the expense of the less critical applications. However, this data may need to first be obtained at a particular location to prioritize the customer's needs.

In some embodiments, the service identification software may be configured to analyze unencrypted data and/or data patterns within data traffic through the plurality of networking devices to provide an intelligent identification of services (e.g., applications) and/or service categories in use by ISP subscribers, for example. These services may include, for example, but are not limited to services such as Facebook, Google, Amazon, Video/Streaming services, and the like. In other embodiments, the service identification software may be configured to identify the category of the service being used, for example, but not limited to categories such as streaming, gaming, and video conferencing. In yet other embodiments, the service identification software may be configured to analyze data and/or data patterns within encrypted data traffic as described hereinbelow.

In some embodiments, the service identification software may be used to provide ISPs information, for example, with a very high granularity per device for every device in a network, in real time or substantially in real time, as to what services each device in the network may be using.

In some embodiments, the service identification software may include at least one algorithm deployed in the processing units of the plurality of networking devices to analyze the data and/or data patterns in the data traffic traversing the plurality of networking devices in the network to a plurality of user devices to determine a plurality of output metrics based on the identified services and/or service categories identified by the service identification software.

The plurality of output metrics may include but are not limited to:
(1) Network visibility and user/devices user patterns
(2) Data usage trends over time
(3) Customer level dashboards for household insights
(4) Business intelligence (BI) data to address upscale marketing investments/efforts
(5) Customer level and service level Quality of Service (QOS)/Quality of Experience (QoE)
(6) Proactive Care
(7) Content Filtering In some embodiments, any or all of the plurality of output metrics may be outputted as a service identification (ID) notification. In other embodiments, the plurality of output metrics may be outputted on a dashboard on a computer display, for example.

In some embodiments, the at least one algorithm may be a trained machine learning model, trained artificial intelligence model, and/or any other type of model.

In certain embodiments, a system for providing intelligent identification of computing services and categories of services in use within a plurality of computing networks is provided. In certain embodiments, the system can include a backend server (e.g., a backend server from the customer cloud 925, SAM cloud 1002, or a combination thereof) configured to control one or more agents configured to perform operative functionality of the system. In certain embodiments, the agents can be software, hardware, or a combination thereof, and can be configured to execute on a network device, such as a gateway, router, switch, or other network device that can communicate and/or provide services for a computing device, such as a computing device at a residence. The system can include a network device in communication with the backend server that is configured to perform a variety of operations and functionality of the system. In certain embodiments, for example, the network device can be configured to analyze, by utilizing the one or more agents, network traffic associated with one or more services requested by one or more devices in communication with the network device. In certain embodiments, the network traffic can be DNS requests, requests to utilize an application, requests to access content associated with a DNS, requests to access network services provided by a customer cloud (e.g., an ISP) or other source of network servicers, any type of network traffic, or a combination thereof.

In certain embodiments, the network device can be configured to compare, by utilizing the one or more agents, the network traffic associated with the one or more services to a service identification list provided by the backend server. In certain embodiments, the service identification list can include a set of domain names or other identifiers and an identification of services and/or categories of the services that are associated with the domain names or other identifiers. In certain embodiments, the network device can be configured to determine, based on comparing the network traffic to the service identification list, a type of the one or more services, a category for the one or more services, or a combination thereof. In certain embodiments, the network device can be configured to provide, by utilizing the one or more agents, an identification of the type of the one or more services, the category for the one or more services, or a combination thereof, to a service provider associated with the network device. In certain embodiments, the type of service can indicate the specific type of application requested by a computing device (e.g., Netflix, Amazon, Zoom, etc.) and the category of the service can indicate the class of service (e.g., streaming, videoconference, web page access, etc.) The network device can be further configured to provide, via the service provider and to the one or more devices, network services corresponding to the type of the one or more services, the category for the one or more services, or a combination thereof.

In certain embodiments, the network device can be further configured to compare the network traffic associated with the one or more services requested by the one or more devices to the service identification list by comparing first domain name service information (e.g., URLs and associated data obtained from the network traffic) associated with the network traffic to second domain name service information (e.g., URLs, classification of services associated with URLs, categories associated with the URLs, etc.) from the service identification list. In certain embodiments, the network device can be further configured to generate a digital file comprising an identification of delta domain names in the first domain name service information that are not in the second domain name service information of the service identification list. In certain embodiments, delta domain names can be domain names that were requested by a computing device that are not present in the service identification list, such as a service identification list from a prior time period. In certain embodiments, the network device can be further configured to identify one or more parameters for one or more services associated with the delta domain names. For example, the parameters can include a service identification, a name, a digital icon, categories, network services required for particular services (e.g., bandwidth, throughput, latency, etc.), types of content associated with the domain names, any other parameters, or a combination thereof. In certain embodiments, the network device can be further configured to identify a top-level domain associated with the delta domain names by executing a matching algorithm using the delta domain names. For example, the matching algorithm can determine commonalities between the various domain names and reduce the number of domains to the top-level domains to be included in the list.

In certain embodiments, the network device can be further configured to, based on the one or more services associated with the delta domain names being determined to exist, add the delta domain names associated with the one or more services to the service identification list. In certain embodiments, the network device can be further configured to create, based on the one or more services associated with the delta domain names being determined to not exist, the one or more services to provide one or more created services for inclusion in the service identification list. In certain embodiments, the network device can be further configured to determine, by utilizing a classification service, one or more categories for the one or more created services. In certain embodiments, the classification service can be program or service that can examine the created services and identify the categories and/or service types for the services. In certain embodiments, the network device can be further configured to generate a plurality of parameters for the one or more created services. The plurality of parameters, for example, can include a service identification, a name, a digital icon, and the at least one category for the one or more created services. In certain embodiments, the network device can be further configured to provide the plurality of parameters to the backend server to update the service identification list to include the one or more created services and the plurality of parameters.

A network device for providing intelligent identification of computing services and categories of services in use within a plurality of computing networks is also provided. The network device can include a memory that stores instructions and a processor that is configured to execute the instructions to cause the processor to be configured to perform a variety of operations. In certain embodiments, the processor can be configured to inspect, by utilizing one or more agents, network traffic associated with one or more services requested by one or more devices in communication with the network device. In certain embodiments, the processor can be configured to compare, by utilizing the one or more agents, the network traffic associated with the one or more services to a service identification list provided by a backend server in communication with the network device. In certain embodiments, the processor can be configured to determine, based on comparing the network traffic to the service identification list, a type of the one or more services, a category for the one or more services, or a combination thereof. In certain embodiments, the processor can be configured to provide, by utilizing the one or more agents, an identification of the type of the one or more services, the category for the one or more services, or a combination thereof, to a service provider associated with the network device. In certain embodiments, the network device can be configured to provision, via the service provider and to the one or more devices, network services corresponding to the type of the one or more services, the category for the one or more services, or a combination thereof.

In certain embodiments, the processor can be further configured to identify a type of the one or more devices in communication with the network device that generated the network traffic. The type of the device can include the model of the device, the category of the device, the capabilities of the device, or a combination thereof. In certain embodiments, the processor can be further configured to determine one or more output metrics of the one or more services based on a pattern associated with data in the network traffic. In certain embodiments, the processor can be further configured to provide the one or more output metrics to a service provider to modify a parameter for the network services in accordance with the pattern. For example, the parameter for the network services can be the quality of service (e.g., bandwidth, throughput, latency, etc.) to be provided for the network traffic, a quality of experience for the network traffic, an amount of network services, a types of network services to provide, or a combination thereof. In certain embodiments, the processor can be further configured to identify the type of the one or more services, the category of the one or more services, or a combination thereof, based on a mapping of a pattern associated with data in the network traffic to the type of the one or more services, the category of the one or more services, or a combination thereof, provided by the service identification list. In certain embodiments, the processor can be further configured to identify the type of the one or more services, the category of the one or more services, or a combination thereof, based on examination of a packet payload of one or more packets associated with the network traffic.

A method for providing intelligent identification of computing services and categories of services in use within a plurality of computing networks is also provided. In certain embodiments, the method can be performed by utilizing a network device, a cloud network, other devices and/or systems, or a combination thereof. In certain embodiments, the method can include analyzing, by utilizing one or more agents executed based on instructions from a memory that are executed by a processor, network traffic associated with one or more services requested by one or more devices. In certain embodiments, the method can include comparing, by utilizing the one or more agents, the network traffic associated with the one or more services to a service identification list. In certain embodiments, the method can include determining, based on comparing the network traffic to the service identification list, a type of the one or more services, a category for the one or more services, or a combination thereof. In certain embodiments, the method can include transmitting, by utilizing the one or more agents, an identification of the type of the one or more services, the category for the one or more services, or a combination thereof, to a service provider associated with the one or more devices. In certain embodiments, the method can include providing, via the service provider and to the one or more devices, network services corresponding to the type of the one or more services, the category for the one or more services, or a combination thereof.

In certain embodiments, the method can include generating one or more images, one or more strings, and/or one or more converted data converted from one or more encrypted data payloads associated with one or more data packets of the network traffic. In certain embodiments, the method can include determining the type of the one or more services, the category of the one or more services, or a combination thereof, based on a first pattern associated with the one or more images, the one or more strings, and/or the one or more converted data matching a second pattern classified for the type, the category, or a combination thereof.

In certain embodiments, some or all of the functionality of the present disclosure can be conducted a cloud network (e.g., customer cloud 925, customer backend 920, SAM cloud 1002, etc.) in communication with a network device interacting with a customer premise equipment. In certain embodiments, certain portions of the functionality of the present disclosure can be performed by the network device, whereas other portions of the functionality of the present disclosure can be performed by the cloud network. In certain embodiments, all of the functionality of the present disclosure can be performed by a cloud network in communication with the network device and/or customer premise equipment.

FIG. 1 is a diagram 100 showing a mapping of data and/or data patterns in the data traffic analyzed by the service identification (ID) software into a data service and data service category in accordance with one or more embodiments of the present disclosure. In certain embodiments, the service identification software may provide an intelligent identification of the data and/or data patterns related to data services such as, for example, "Yahoo Finance", "Netflix", and/or "Disney Plus" and/or data service categories such as "Browsing", "Streaming", and/or "Gaming". These classifications may be used by service providers, for example, for real-time and session-based analytics, usage and/or time analyses, bandwidth consumption, session quality scoring, and/or usage patterns and/or trends. In certain embodiments, the classifications can be utilized by service providers to adjust parameters associated with network services being provided to computing devices that belong to subscribers that are generating and/or accessing the data traffic analyzed by the service ID software. For example, the parameters that can be adjusted can include, but are not limited to, an amount of bandwidth made available to the computing devices, a latency level associated with network services provided to the computing devices, a throughput level provided to the computing devices, an available download rate, an available upload rate, a medium of connectivity (e.g., satellite, fiber, coaxial, wireless, mesh, etc.), a security level (e.g., a type of encryption to be utilized, etc.), any other types of parameters associated with network services (e.g., internet connection services, television connection services, phone connection services, etc.), or a combination thereof.

Figure 2:
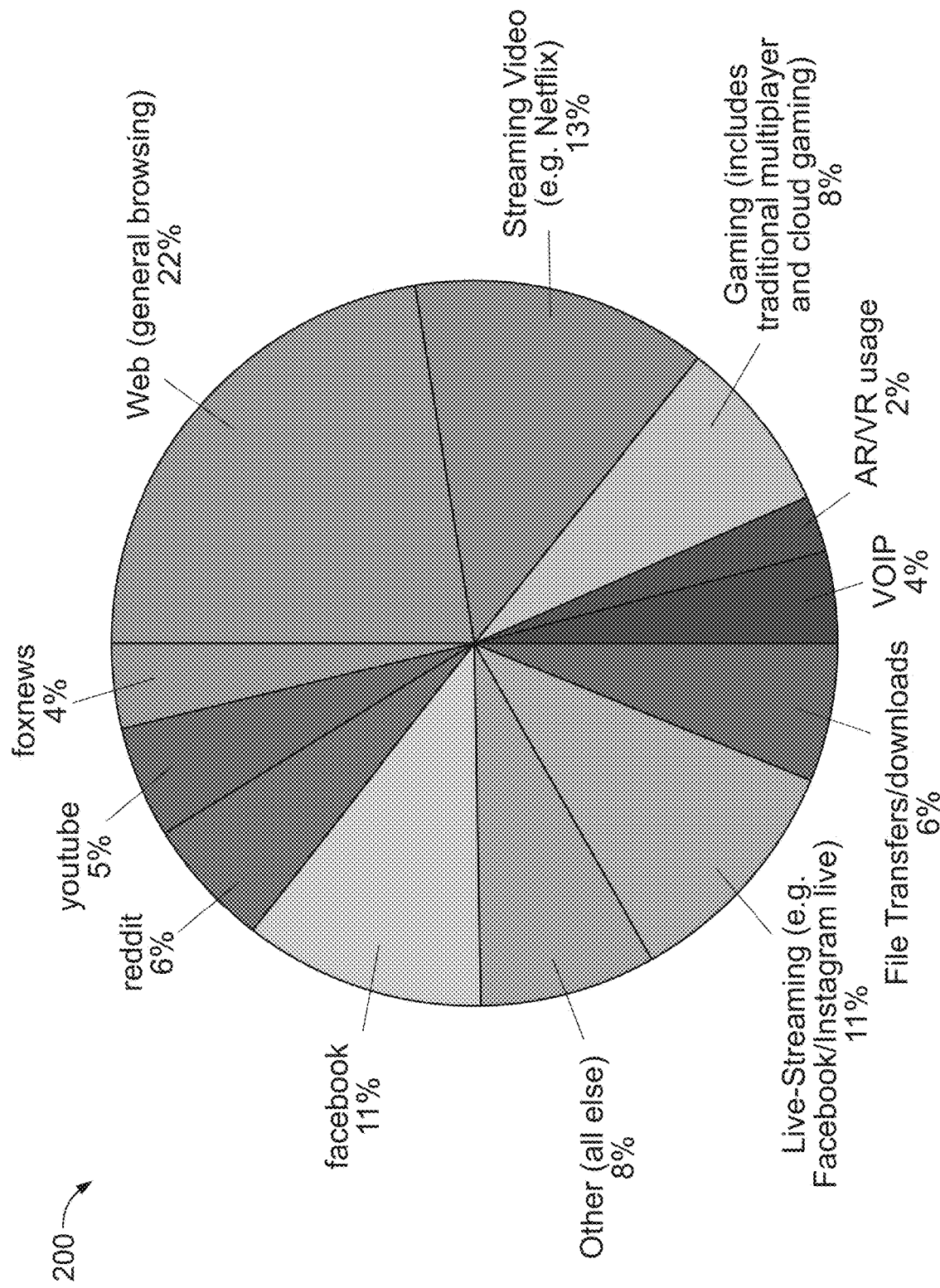
FIG. 2 is a pie chart graph of a data usage in networking devices associated with an internet service provider in accordance with embodiments of the present disclosure.

FIG. 2 is a pie chart graph 200 of a data usage in networking devices associated with a customer cloud (e.g., an ISP) in accordance with one or more embodiments of the present disclosure. The service identification software deployed in the plurality of networking devices may be used to identify that the data traffic through the plurality of network devices generated by data from a plurality of services and to generate a report illustrating a breakdown of the data usage for each of the plurality of services as shown in FIG. 2. Accordingly, the ISP may update, based on the usage patterns, the service quality policy per user/group of user-specific computing devices in a network provided by the ISP.

Figure 3:
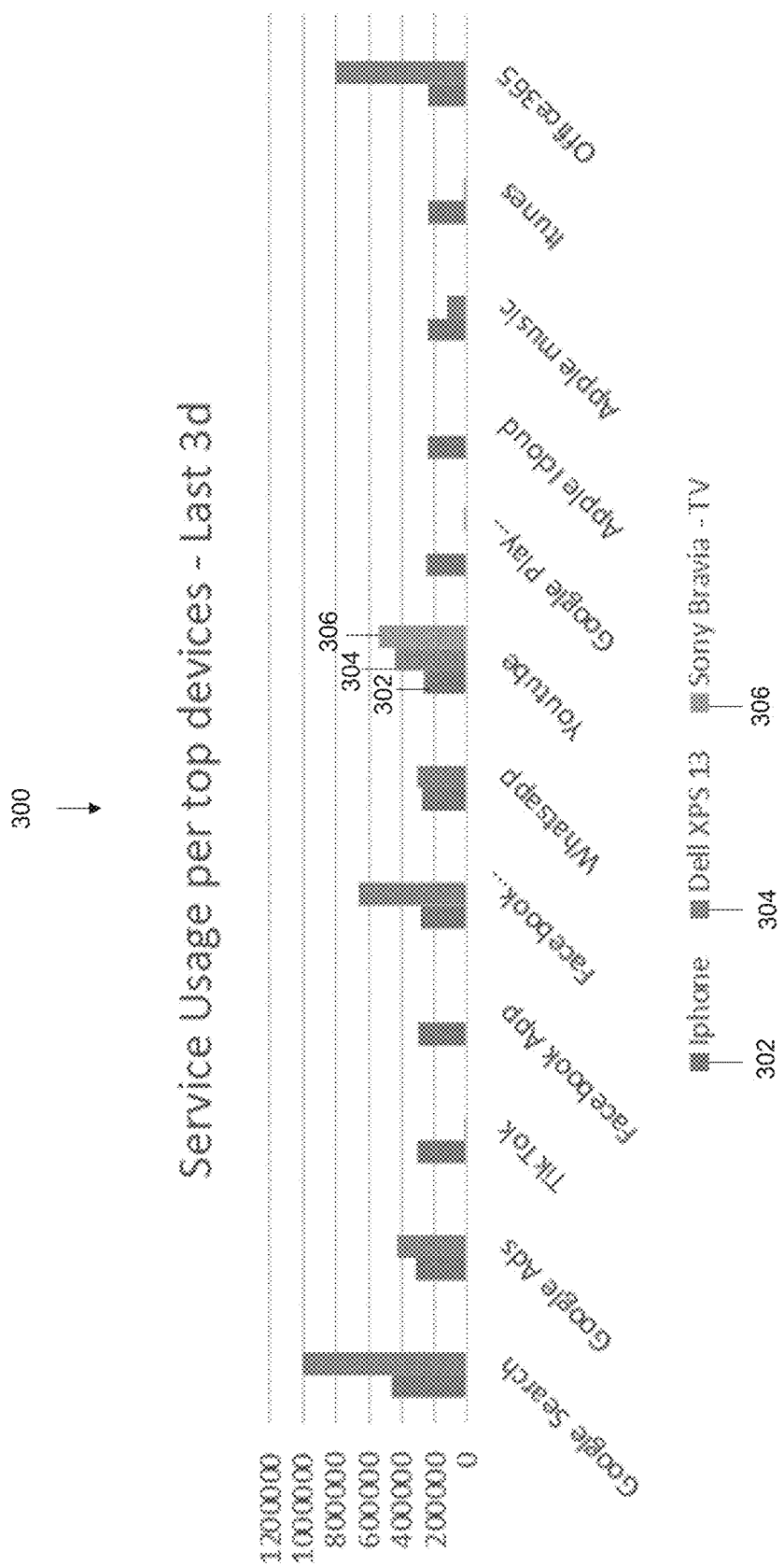
FIG. 3 is a bar diagram generated by the service identification software illustrating a service usage per top computing devices over a period of three days in accordance with embodiments of the present disclosure.

FIG. 3 is a bar diagram 300 generated by the service identification software illustrating a service usage per top computing devices in the last three days in accordance with one or more embodiments of the present disclosure. For example, the bar diagram 300 illustrates services usage for a mobile device 302, a computer 304, and a television 306 over a period of three days.

Figure 4:
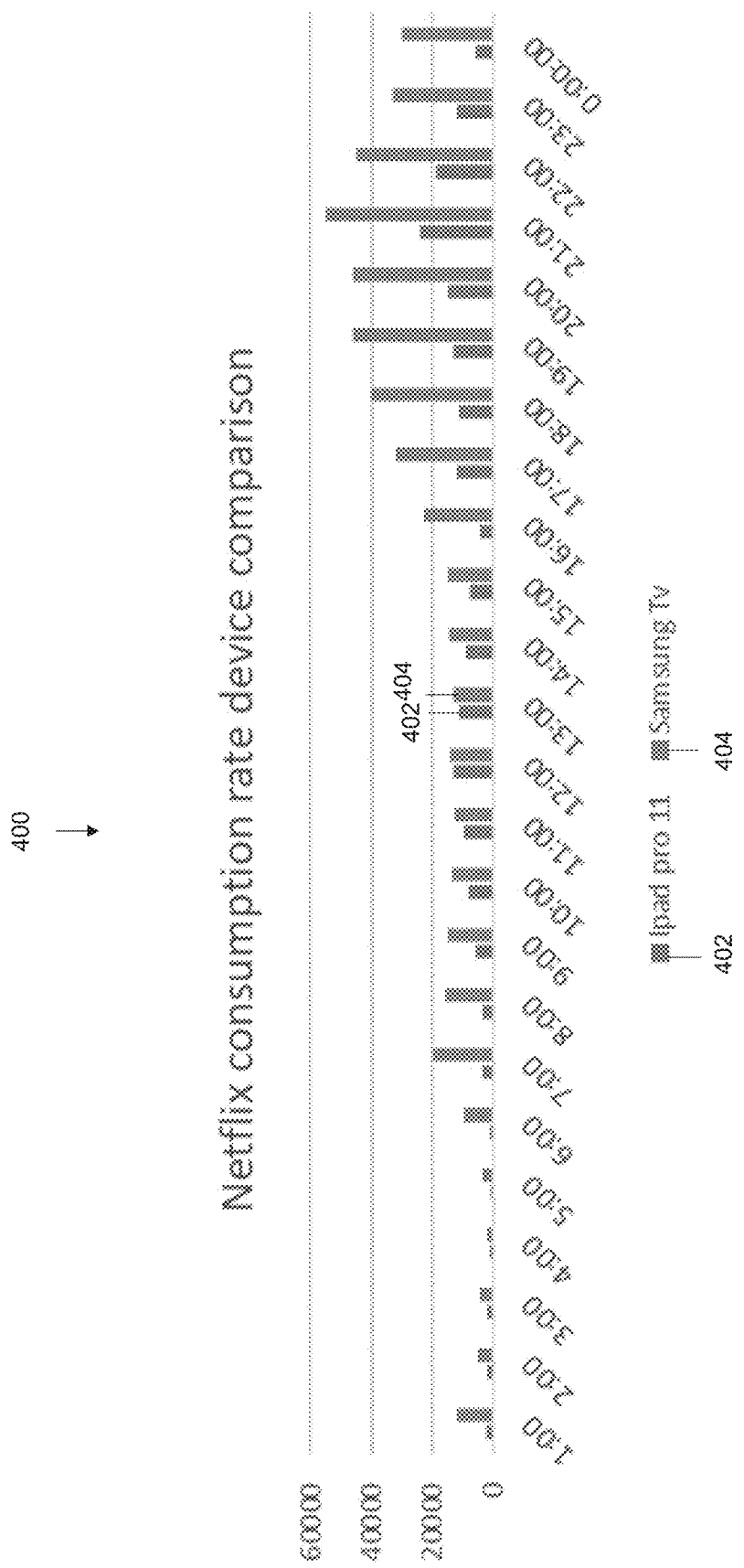
FIG. 4 is a bar diagram generated by the service identification software illustrating network consumption rate device comparison in accordance with embodiments of the present disclosure.

FIG. 4 is a bar diagram 400 generated by the service identification software illustrating network consumption rate device comparison in accordance with one or more embodiments of the present disclosure. For example, the bar diagram 400 illustrates network consumption rate comparisons for a mobile device 402 and a television 404.

In some embodiments, the service identification software may be configured to provide detailed information regarding specific end-user-device service consumption and quality rates which may be used by the ISP to mitigate and address end-user complaints regarding service quality.

Figure 5:
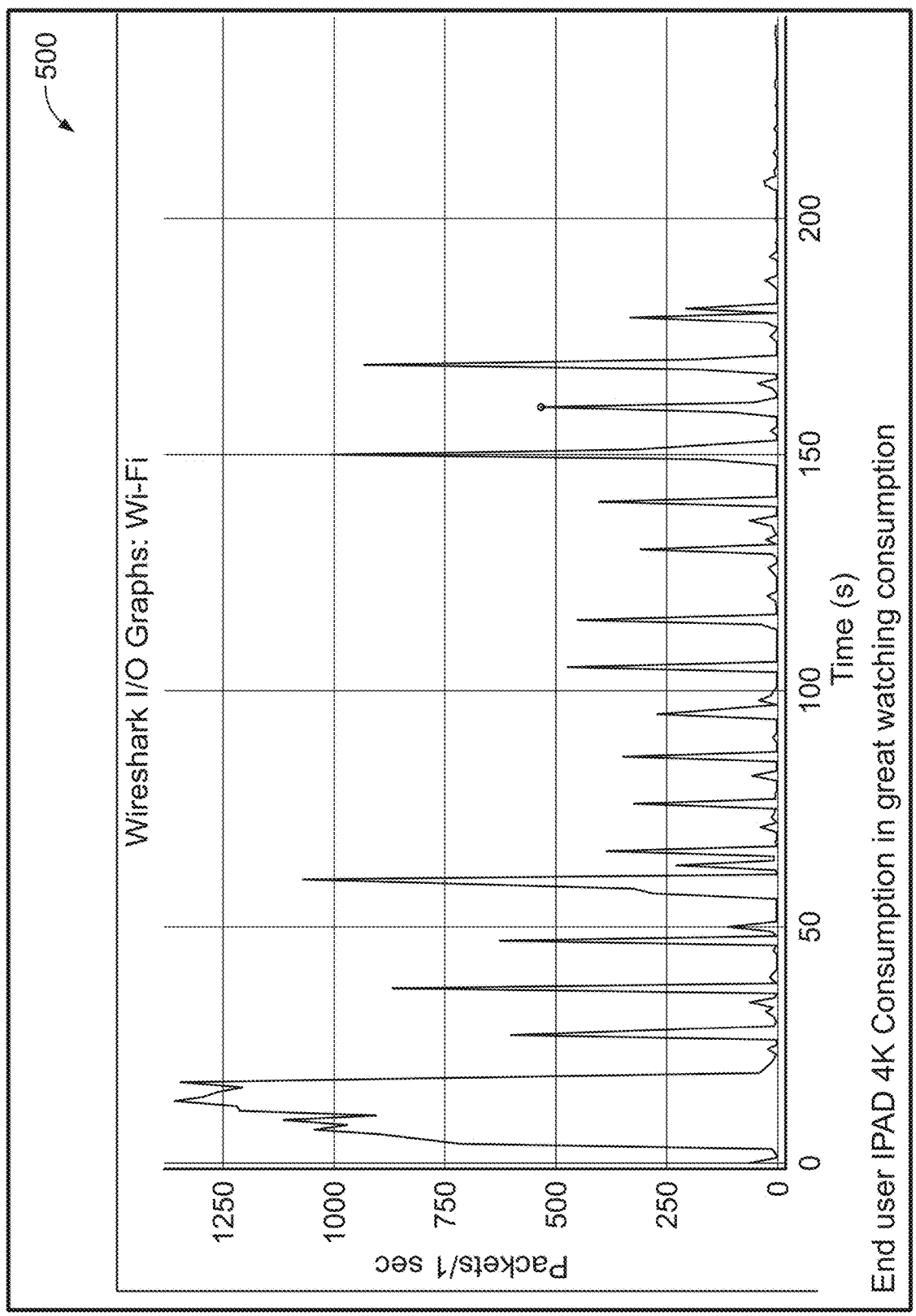
FIG. 5 is a graph of a number of data packets per second used by an end user device over time as generated by the service identification software in accordance with embodiments of the present disclosure.

FIG. 5 illustrates a first graph 500 of a number of data packets per second used by an end user device (e.g., an IPAD) over time as generated by the service identification software in accordance with one or more embodiments of the present disclosure.

Figure 6:
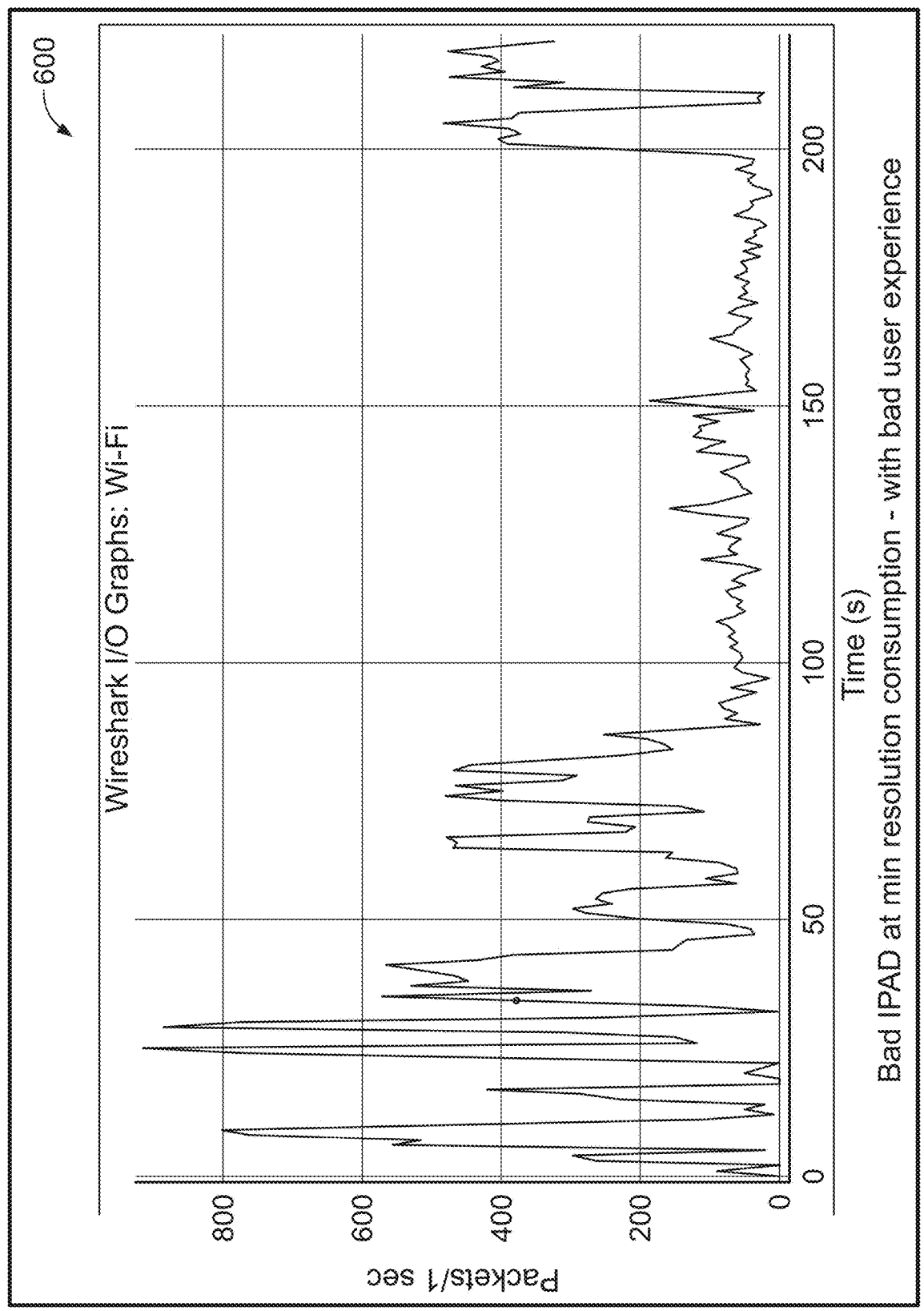
FIG. 6 is a second graph of a number of data packets per second used by an end user device over time as generated by the service identification software in accordance with embodiments of the present disclosure.

FIG. 6 illustrates a second graph 600 of a number of data packets per second used by an end user device (e.g., an IPAD) over time as generated by the service identification software in accordance with one or more embodiments of the present disclosure.

The first graph in FIG. 5 shows that the customer cloud (e.g., ISP) is providing a good QoE (e.g., supplying enough data packets for great 4K watching consumption) for the end user customer watching 4K resolution content on an IPAD. The second graph in FIG. 6 shows that the ISP is not providing a good QoE (e.g., not supplying enough data packets for a minimum resolution experience) for the end user customer watching 4K resolution content on an IPAD.

In some embodiments, the plurality of output metrics for the identified services and/or service categories may be used by the internet service providers to vary data transmission parameters controlling the data and/or data patterns in the data traffic through the plurality of networking devices to ensure that their customers receive the best quality of service (QOS) and/or quality of experience (QoE).

Figure 7:
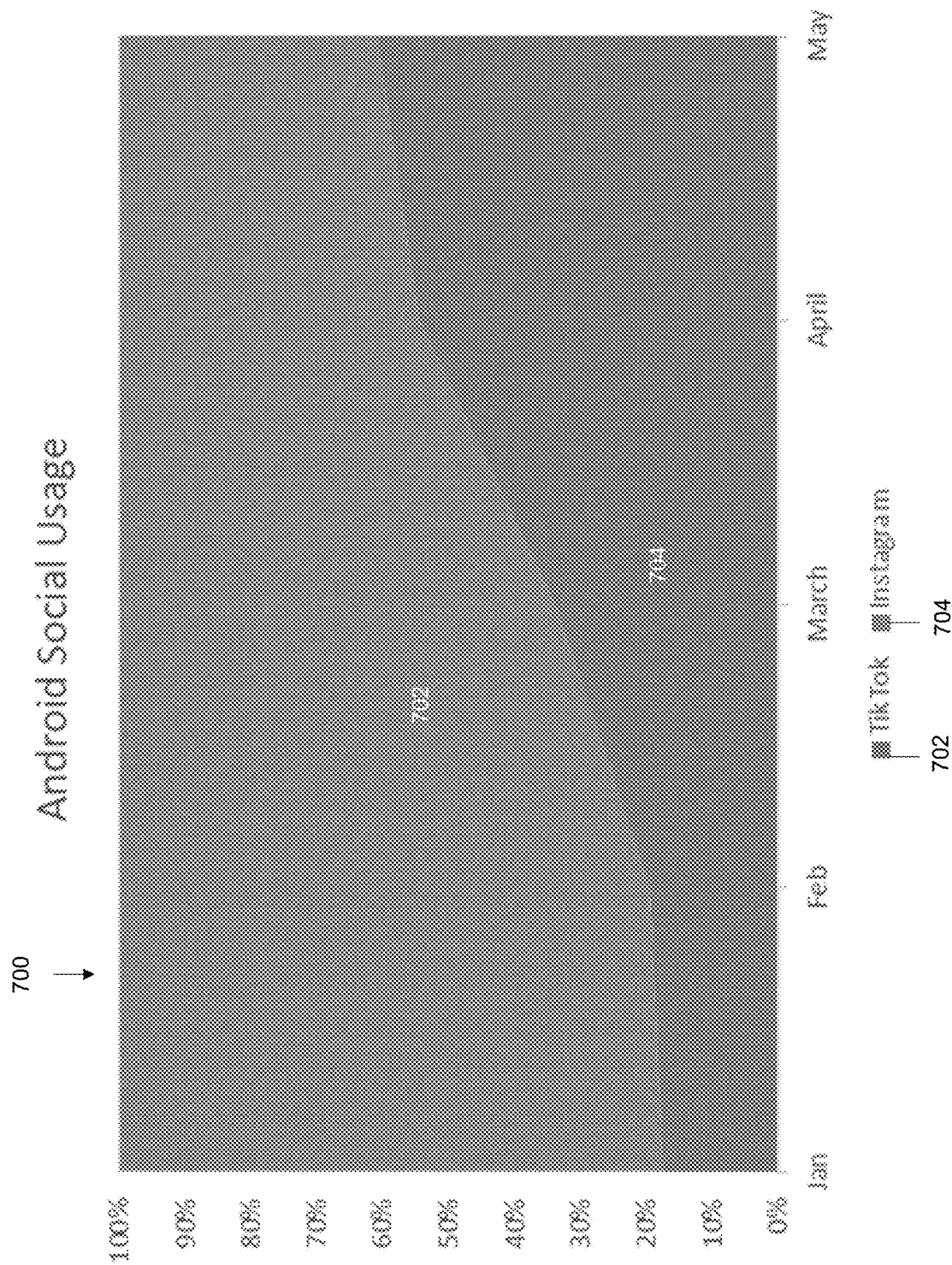
FIG. 7 is a graph showing social media platform usage over a period of time in accordance with embodiments of the present disclosure.
Figure 8:
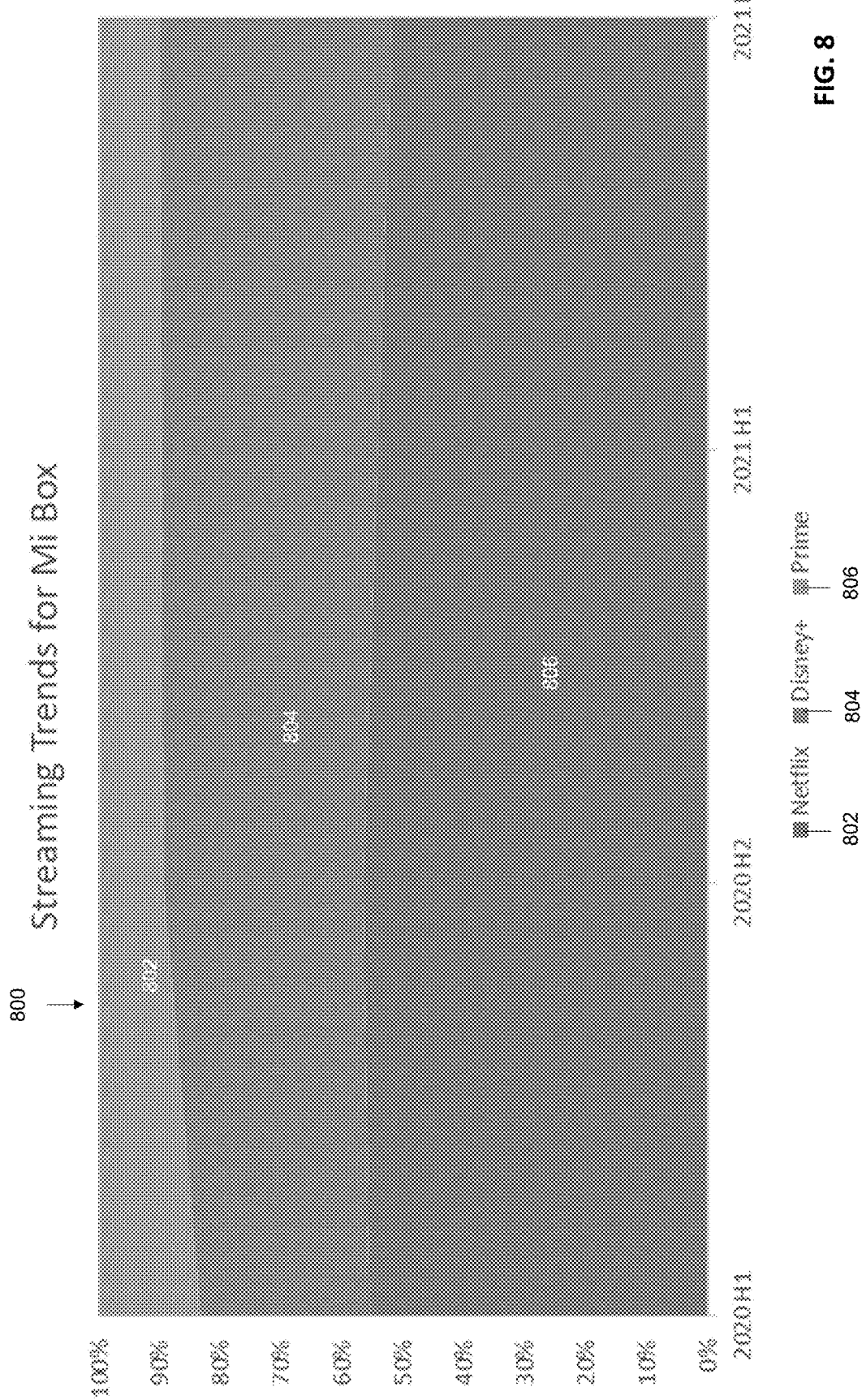
FIG. 8 is a graph showing streaming trends in a streaming device over a period of time in accordance with embodiments of the present disclosure.

In some embodiments, the service identification software may use historical data as shown in the examples of FIGS. 7 and 8 hereinbelow to determine service trends per device usage for providing real time data and trends that may help customers such as ISPs to shape add-on services, marketing, and up-sale strategies.

FIG. 7 is a graph 700 showing social media platform usage over a period of time in accordance with one or more embodiments of the present disclosure. For example, the graph 700 shows usage a first platform 702 (e.g., TikTok) and a second platform 704 (e.g., Instagram) over a period of months.

FIG. 8 is a graph 800 showing streaming trends in a streaming device (e.g., MiBox) over a period of time in accordance with one or more embodiments of the present disclosure. The graph 800 of FIG. 8 shows that the usage of a first service 802 (e.g., Netflix), a second service 804 (e.g., Disney+) and a third service 806 (e.g., Amazon Prime Video) to be steady from 2020 to 2021 with the second service 804 (e.g., Disney+) gaining usage at the expense of the first service 802 (e.g., Netflix) toward the end of 2021.

In some embodiments, the plurality of network devices associated with at least one service provider (ISP) may provide service to a plurality of end user (customer) computing devices. The service identification software that may be deployed in each of the plurality of network devices, may be configured to analyze data from data traffic through each of the plurality of network devices that may be transmitted to the backend server over the communication network as described previously. After the plurality of output data metrics may be extracted from the analyzed data from each of the network devices in a plurality of networks associated with a plurality of ISPs, the backend server processor may use this data to build training datasets for training the at least one algorithm used in the service identification software to predict different market and/or service trends over multiple ISPs.

Figure 9:
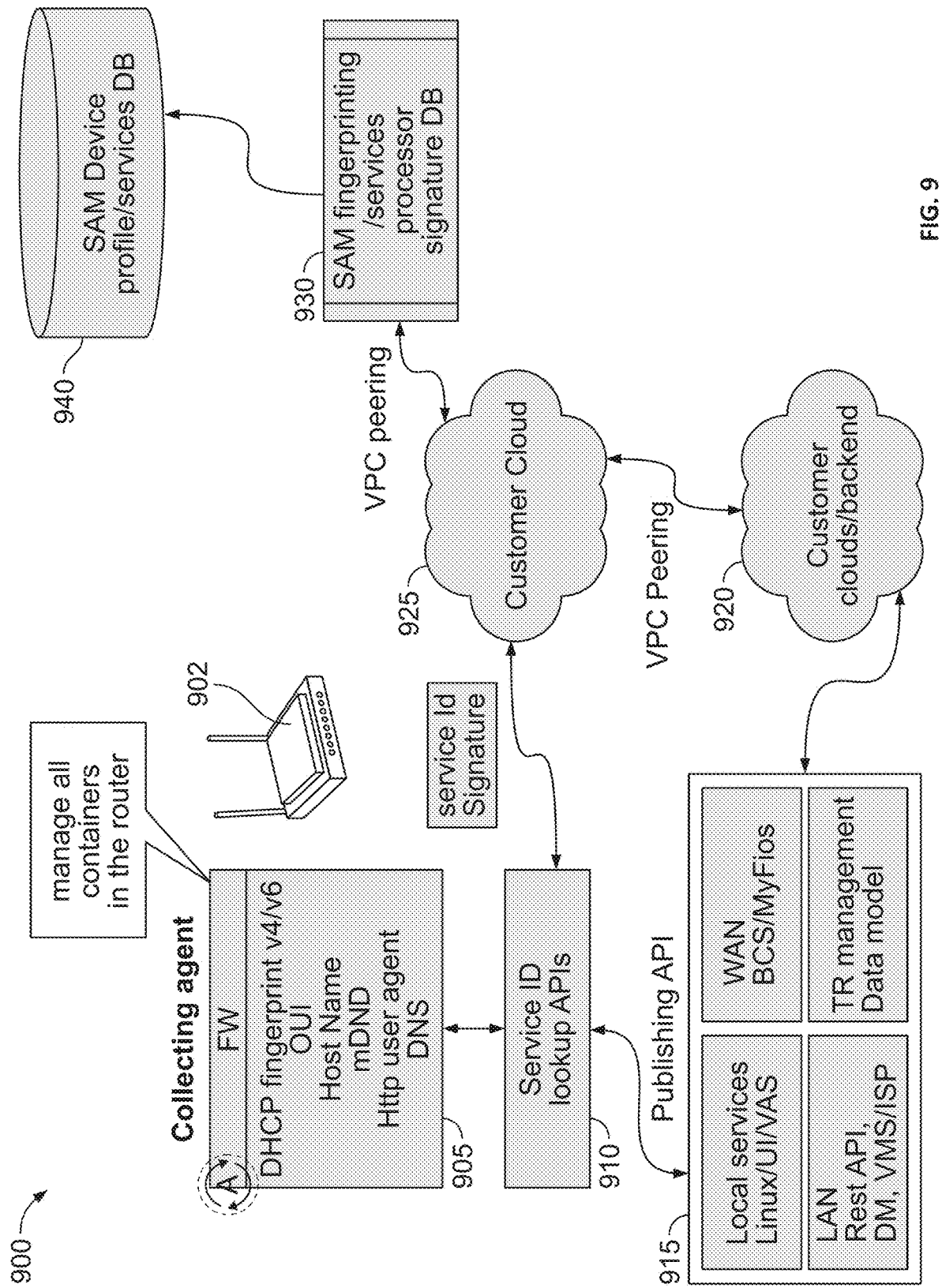
FIG. 9 is a data flow diagram of the service identification software deployed in networking devices of a home environment in accordance with embodiments of the present disclosure.

FIG. 9 is a data flow diagram of an architecture 900 of the service identification software deployed in networking devices of a home environment in accordance with one or more embodiments of the present disclosure. In certain embodiments, the architecture 900 can include any number of devices, networks, and/or components. Illustratively, for example, the architecture 900 can include a network device 902 (e.g., a router, switch, gateway, etc.), which can include a software agent that can be configured to obtain data from computing devices communicating with the network device 902. Such data can include, but is not limited to, a device fingerprint (e.g., an identifier that identifies a particular device and/or its type), organizational unique identifier (OUI), host name, mDND, http user agent, DNS, and/or any other data associated with the computing device interacting with the network device 902. In certain embodiments, the architecture 900 can include a service identification lookup API 910 that the agent 905 can interact with to obtain a service identification of one or more services requested by a computing device interacting with the network device 902. An customer cloud network 925, such as a data collection cloud, an ISP cloud, and/or other types of customer cloud, can be configured to provide a service identification signature to the service identification API 910, which can be provided to the agent 905. The architecture 900 can also include a publishing API 915 for local services, wide area network services, LAN services, management data model services, and/or other services. The architecture 900 can also include a backend customer network 920 (e.g., backend ISP network) that can interact with the publishing API 915 and the customer cloud network 925. For example, the customer backend network 920 can conduct virtual private cloud peering (VPC) peering with the customer cloud network 925. In certain embodiments, the customer cloud network 925 can also do VPC peering with a fingerprinting/services processing signature database 930 that can be configured to store device fingerprinting information. In certain embodiments, the fingerprinting/services processing signature database 930 can be configured to interact with a device profile/services database 940, which can store information associated with the devices and services being provided to the devices.

Figure 10:
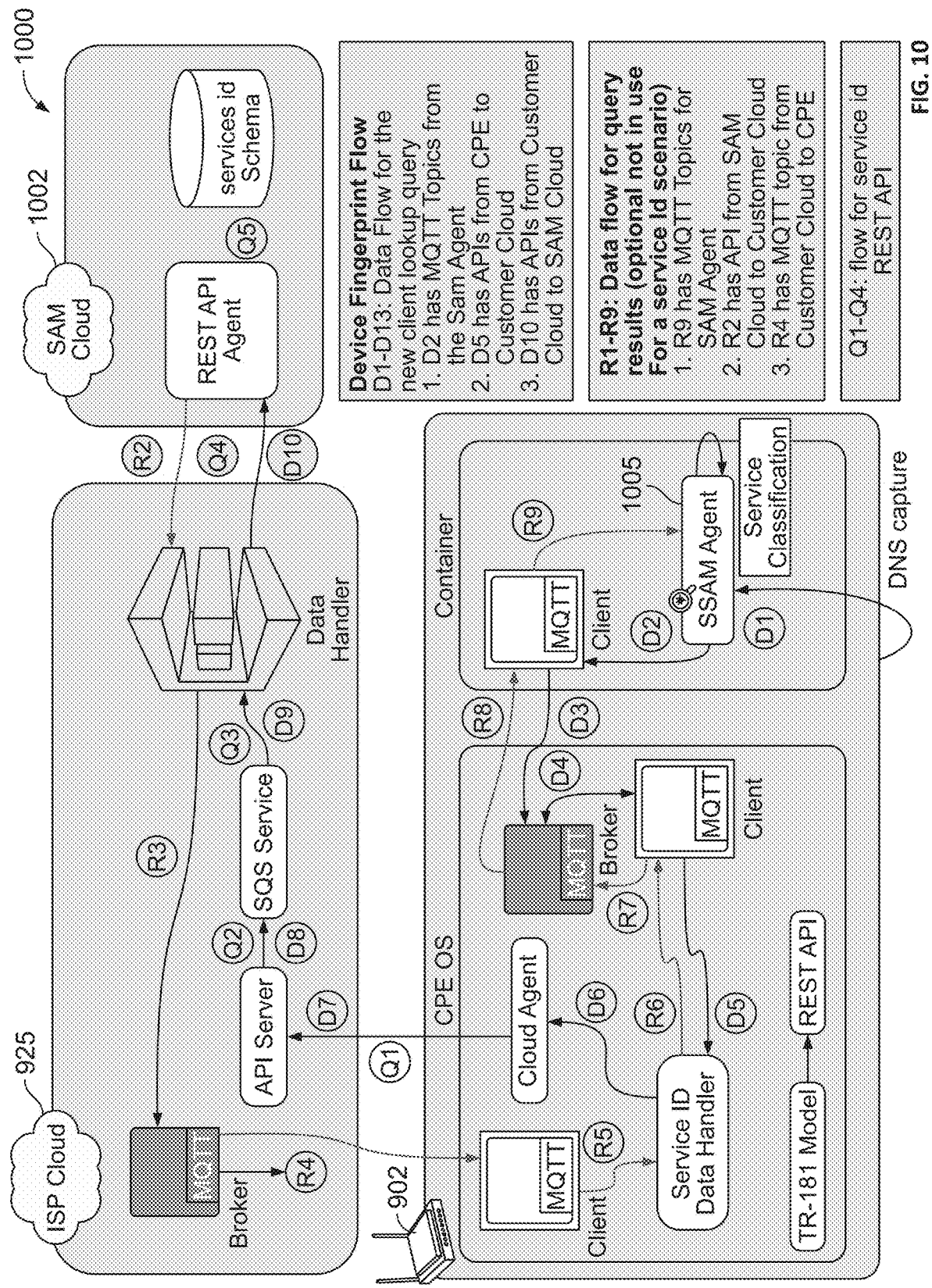
FIG. 10 is a data flow diagram of the agent service identity process in accordance with embodiments of the present disclosure.

FIG. 10 is a data flow diagram of the agent service identity process 1000 in accordance with one or more embodiments of the present disclosure. This diagram shows the end-2-end data flow from the SAM Agent 1005 to the router customer premise equipment (CPE) 902 (e.g., network/networking device) to the customer cloud 925 to SAM cloud 1002 and then back.

The service identification software agent may be deployed on networking devices associated with users of a household as a containerized agent using device fingerprinting as a basis for analyzing service consumption. For example, the agent may be running in Linux Containers (LXC) on a router. Device fingerprinting, or alternatively, device identification, in a home network may include network mapping to view and analyze connected devices, the type of devices/device models of the connected devices, the status of each device's connection, home and guest zones to classify different groups of devices, notification of new devices connecting to the network, and/or bandwidth consumption reports of each connected device. The service identification software in the home environment may be configured to capture and analyze data traffic, to notify firmware (FW) middleware (e.g., router firmware) on session status changes, to use enriched notifications with content category identification (i.e., social media), and/or to aggregate sessions content categories by the device/home network.

In some embodiments, different ISPs may request that the service identification software may be used for onboarding third-party over-the-top products such as for example, parental control, QoS, QoE, troubleshooting, and/or digital well-being. The third-party products may use service ID notifications generated by the service identification software. Consumption of the service ID data may be implemented by binding the service ID data to a router firmware message queueing telemetry transport (MQTT) Broker used in the customer cloud.

In some embodiments, service ID notifications may be based on the device identification infrastructure as an extension to the currently provisioned agent, where the service identity may use the same networking, security, and deployment mechanisms as used in the currently provisioned agent. The information may be consumed by accessing a dedicated endpoint that returns data per requested sam_id, and the network data flow may be sent to the backend server for device tagging (e.g., fingerprinting) similarly to received IoT data, for example.

In some embodiments, the service identification software may be configured to identify for every premise equipment (PE), the amount of data used per predefined 85% of all services traffic categorized into services and categories.

In some embodiments, Service ID definitions and Category definitions (for reputation) may be maintained in the backend server. The service identification software agent may download the definitions upon startup and may check for updates every 12 hours, by default. In other embodiments, updates to the service lists may be sent from the backend server via the customer cloud to the CPE with the SAM service ID software agent running in the LXC container.

In some embodiments, the categories mapping, currently defined as static, may be changed to dynamic, as this has implications on the reputation service as well as on the whitelist categories bitmap. Caching this data, whitelists, and local cache may be part of the Agent classification caching.

In some embodiments, the Service ID may be handled by the Agent deployed on the customer cloud (e.g., ISP) routers. The agent may send classified information via the customer cloud to the SAM Cloud every X minutes, where X may be a predefined time interval. The information may be aggregated in buckets of Y seconds (initially 60).

In some embodiments, the backend server may process the received data and may store it for retrieval. The retrieval may support aggregation by device_id, OS, Service_id, service_category, vendor, device_type, router_id, product_name, measure_name, and time (timestamp) with measure_value of RX and TX. The retrieved data may be stored in a database on the backend server.

In some embodiments, the SAM backend server may support application programming interfaces (APIs) to retrieve the Service ID data. The APIs may be accessible through isp-gateway (cloud-to-cloud auth).

Figure 11:
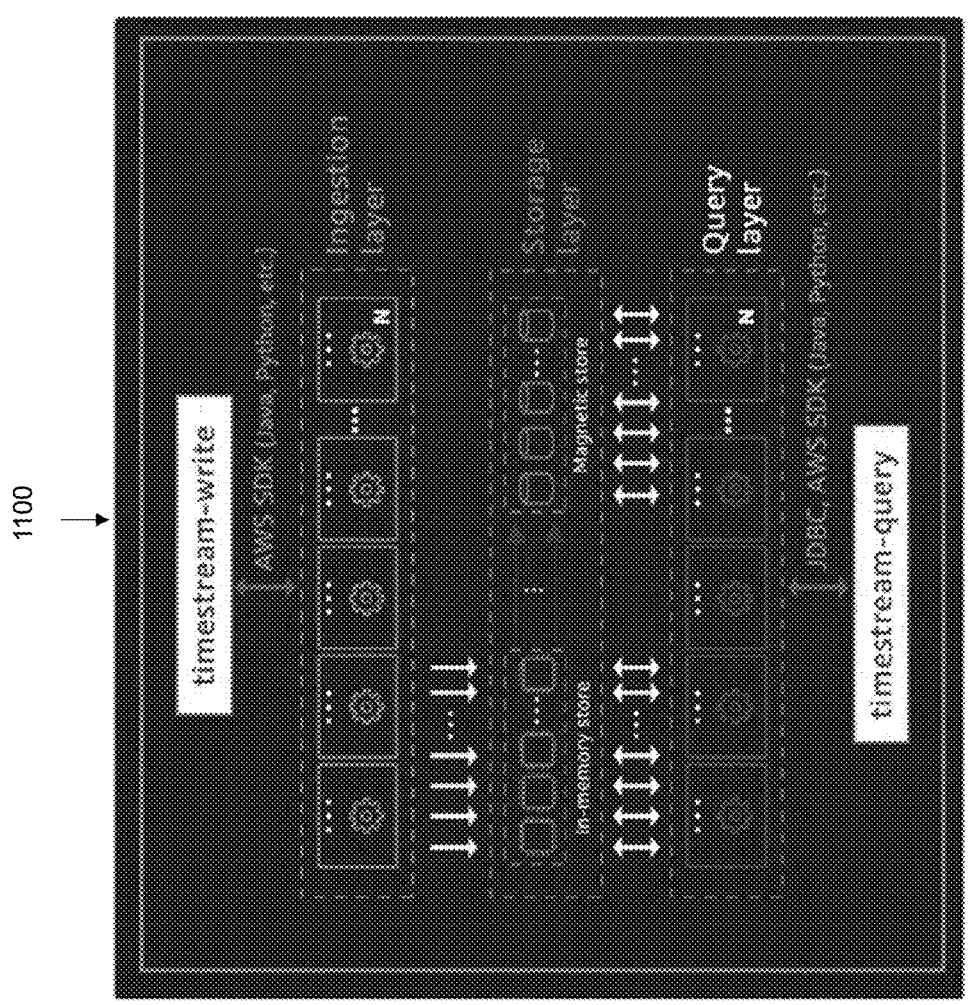
FIG. 11 is a diagram illustrating an architecture of time series database used by the backend server in accordance with embodiments of the present disclosure.

FIG. 11 is a diagram illustrating an architecture 1100 of a time series database (e.g., Amazon Timestream_ used by the backend server in accordance with one or more embodiments of the present disclosure.

In some embodiments, the backend server may use process the received data over a given time interval (e.g., time series) by Amazon Timestream. Amazon Timestream is a fast, scalable, and serverless time series database service for IoT and operational applications, that makes it easy to store and analyze trillions of events per day, up to 1,000 times faster and at as little as 1/10th the cost of relational databases. Amazon Timestream may save time and costs in managing the lifecycle of time series data. Its purpose-built query engine may enable access to analyze recent and historical data within a single query.

FIG. 12 illustrates a table 1200 of the retrieved data for storage in accordance with one or more embodiments of the present disclosure. As shown in FIG. 12, the retrieved data may include, for example, but is not limited to a router_id, a device_id, a service_id, a measure name, a measure value, and/or timestamps.

In some embodiments, the database schema may include, for example, parameters such as, but not limited to:
  product_family (varchar)
  device_id (varchar)
  os (varchar)
  Service_Category (varchar)
  Service_Id (varchar)
  vendor (varchar)
  device_type (varchar)
  router_id (varchar)
  product_name (varchar)
  measure_name (varchar)
  time (timestamp)
  measure_value::bigint (bigint)

FIG. 13 is an exemplary embodiment of a query sample script 1300 in accordance with one or more embodiments of the present disclosure. The query sample may be used by the service identification software to generate the data in a network device as shown in the next FIG. 14.

FIG. 14 is a table 1400 of data generated using the query script of FIG. 13 in accordance with one or more embodiments of the present disclosure. The generated data in the table shows value for the binned_time, router_id, device_id, service_id, measure_name, and measure_value. Note that the service ID values shown in FIG. 14 can be services, such as Amazon, Amazonaws (Amazon Web services), Bing, and Duckduckgo.

Figure 15:
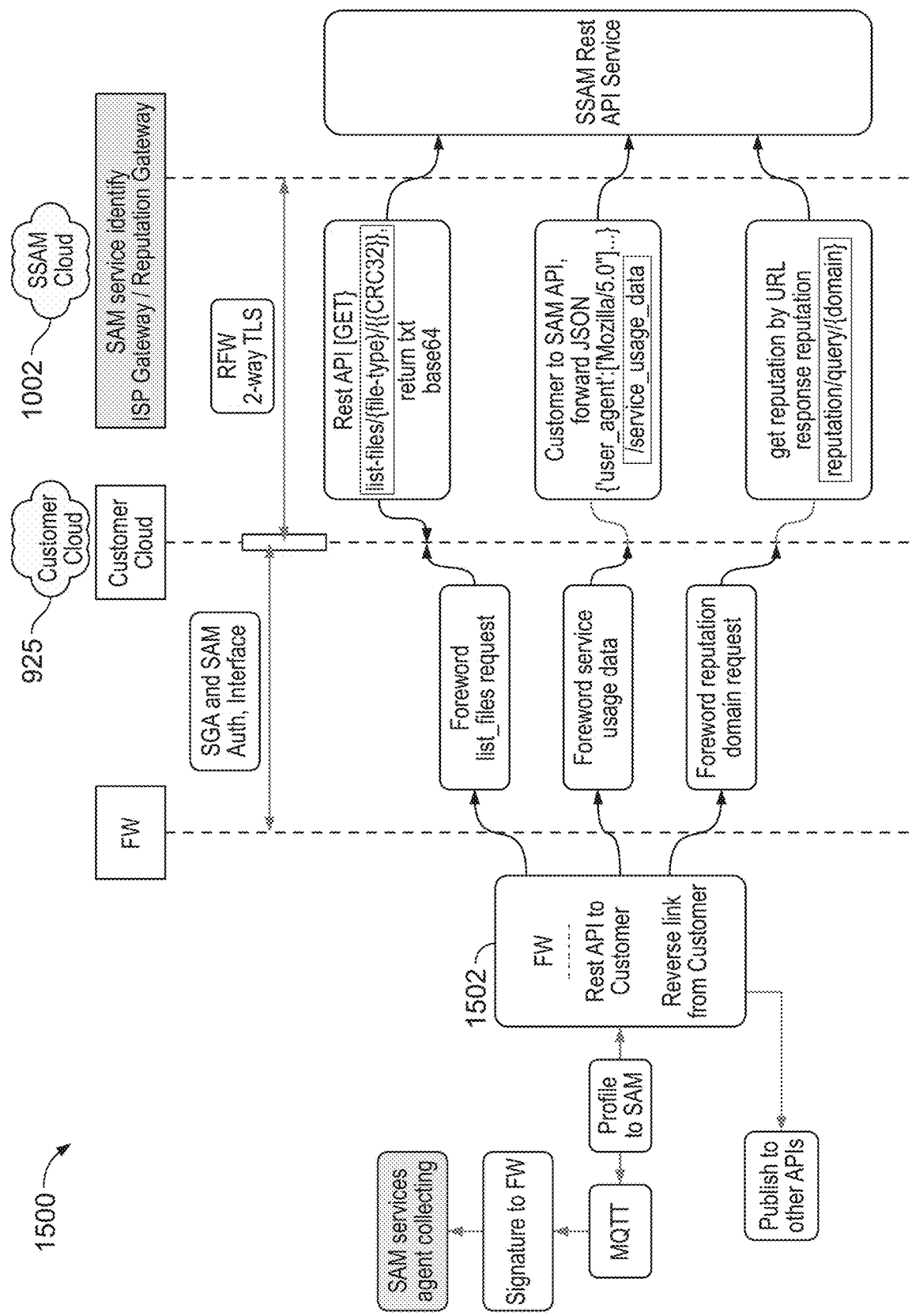
FIG. 15 is an exemplary data flow graph of the service identification software agent using agent messages and a gateway in accordance with embodiments of the present disclosure.

FIG. 15 is an exemplary data flow graph 1500 of the service identification software agent using agent messages and a Gateway API in accordance with one or more embodiments of the present disclosure, which may involve utilizing router firmware 1502, a customer cloud 925, SAM cloud 1002, and/or any other devices and/or components of the present disclosure. The agent may communicate with router firmware through the MQTT broker in the CPE as part of the customer cloud (e.g., ISP) domain. The general flow of the agent may be as follows:

1. List-files Request

The agent may need three types of files:
  Classification—mapping of service and category names.
  whitelist—list of the most commonly used URLs with their categories and reputation
  non-blockable domains—domains that are not be counted as network usage The agent issues the request to the MQTT topic /FW/list_files with the type of the requested files and CRC32 message: {file-type}/{{CRC32} } message example: classification_defs/461707669

This message may be handled by router firmware which may forward it to the customer cloud 925, which creates an API call with URL param to SAM isp-gateway. The message data from the topic may be added as a URL param to the REST of resource /v3/download/list-files/URL Request format:

[GET] https://{{gateway} }/v3/download/list-files/{file-type}/{{CRC32} }

Examples of requests may include:

[GET] https://{{gateway} }/v3/download/list-files/classification_defs/f61707669

[GET] https://{{gateway} }/v3/download/list-files/whitelist/241807865

[GET] https://{{gateway} }/v3/download/list-files/non_blockable_domains/626489f64

2. List-files response

The response may be handled by the customer cloud 925 and forwarded the response to both the firmware (FW) (e.g., router firmware) 1502 and MQTT broker.

The API gateway response with the relevant file in the payload in base64 format.

The payload may be forwarded as a message with the file type to MQTT topic /fpdi/list_files/ in the following message format:

```
{
file-type: {file-type},
content: list-files resource API response payload
crc32: file content representation of the hexadecimal value of a 32-bit binary sequence to
validate payload hasn't been compromised
}
for example:
{
file-type: classification_defs,
content:ewogICAgInNlcnZpY2VzIjogWwogICAgICAgIHsKICAgICAgICAgICAgIklkIj
ogMSwKICAgICAgICAgICAgIm5hbWUiOiAiQW1hem9uIiwKICAgICAgICAgIn
VybHMiOiBbCiAgICAgICAgICAgICAiYW1hem9uLmNvbSIsCiAgICAgICAgIC
AgICAgICAiYW1hem9uLm5sIiwKICAgICAgICAgICAgICJhaXYtZGVsaXZlcnk
ubmV0IiwKICAgICAgICAgICAgICJhbWF6b24uY28u
...
AgICAgICB7CiAgICAgICAgICJJZCI6IDUsCiAgICAgICAgICJOYW1lIjogI
kdhbWluZyIsCiAgICAgICAgICJ3ZWJyb290X2NhdHMiOiBbCiAgICAgICAgIC
AgICAgICAzNAogICAgICAgICBdCiAgICAgICAgfQogICAgXQp9Cg==
crc32: f2726906
}
```

SAM agent may need to subscribe to /fpdi/list_files/ and may receive the message with the file-type, file-content in base64, and crc32

3. Sending usage data may be triggered according to a scheduler (configurable parameter Usage_buckets, default 60 sec with two buckets, in total every 2 min) and send a message with the usage data to MQTT topic: /FW/deviceid/usage_data This message may be handled by MQTT subscriber forwarded by router firmware to customer cloud which sends a rest may request HTTPS://{{gateway}}/v3/stats/service_usage_data with the usage data message being sent in the API post body to SAM isp-gateway, 3. To get the reputation, only for domains that may not have already received in services list classification_defs, the agent may send a specific domain to a topic: /FW/deviceid/reputation/query with the URL in the message: {com.facebook.katana}, the subscriber of the topic in the router firmware may get the message and may forward the request to customer cloud which may send a REST API request to SAM isp-gateway:
[GET] https://{{reputation-gateway} }/v3/reputation/query/{domain} the response may be handled by the customer cloud and may forward the response to router firmware and MQTT broker.

MQTT may produce accordingly to /fpdi/deviceid/response/reputation.

4. The agent may subscribe to the topic/fpdi/deviceid/response/reputation to get the reputation definition of a URL sent in a previous call. The message may be a forward from the response body of the server [GET] HTTPS://{{reputation-gateway} }/v3/reputation/query/{domain}
API.

The agent mayexpect a message in the following format:
{"address": "google.com", "reputation": 100, "categories": ["general"], "alt_categories": ["Web"], "category_ids": [1]}

Figure 16:
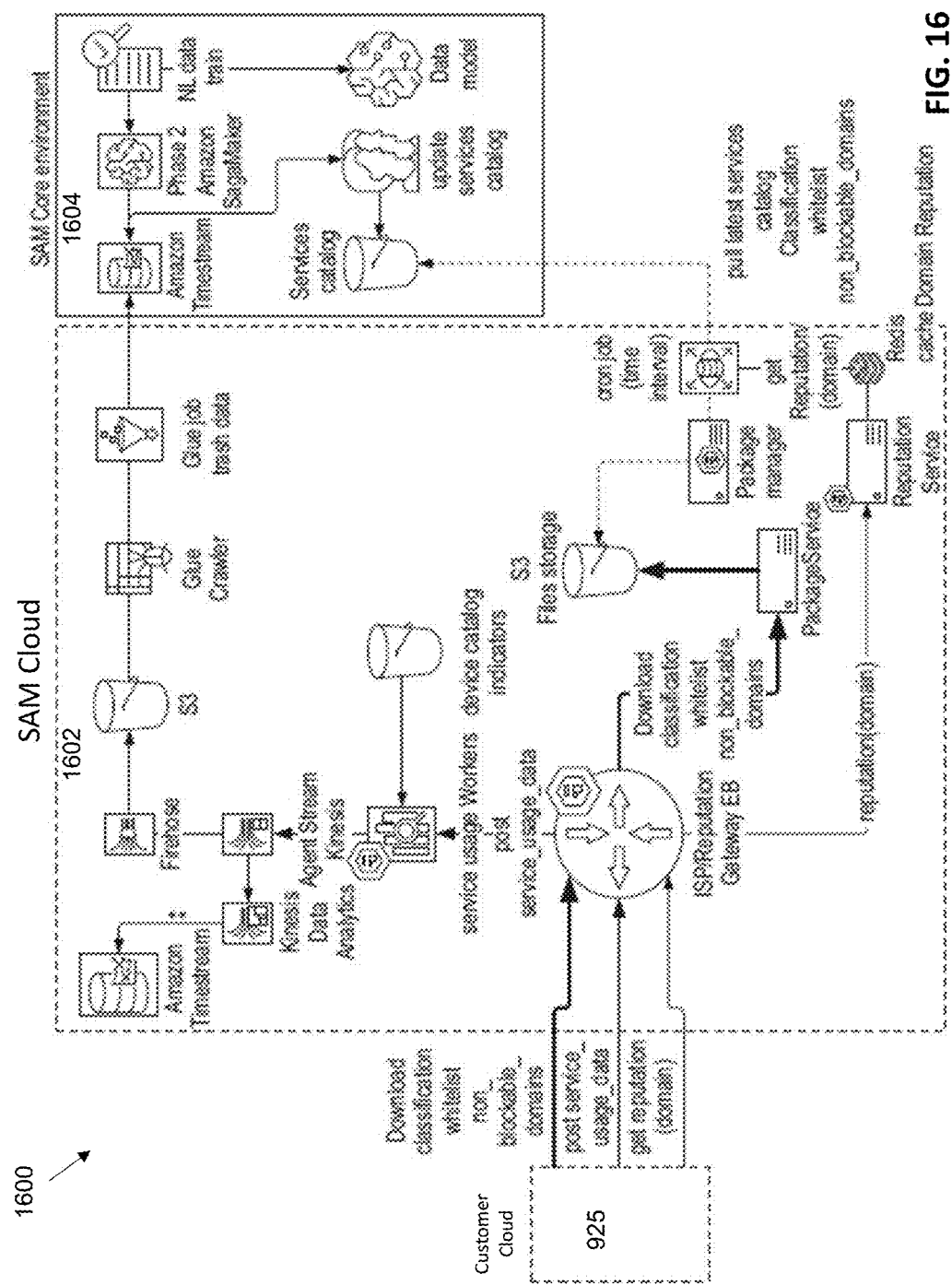
FIG. 16 is a service identification cloud diagram in accordance with embodiments of the present disclosure.

FIG. 16 is a SAM Service ID Cloud Diagram 1600 in accordance with one or more embodiments of the present disclosure. In certain embodiments, the cloud diagram 1600 can include the customer cloud 925, the SAM Cloud (e.g., ISP) 1602, a SAM core environment 1704, and/or any other devices and/or components. Once the data has been stored in the DB (Amazon Timestream), a glue job may replicate the necessary data to the SAM core environment 1604 (an identical process with device catalog) that may include a hash for router_id and device_id and may be stored in SAM core for analysis.

In some embodiments, in the SAM Core environment 1604 implementing an ETL (Extract, Transform, and Load) pipeline used for a device catalog (DC), the data may be processed, and the updated services data may be fed back to the customer cloud 925. The package manager service may pull every pre-defined time interval of the latest files and may store them internally (s3bucket). The DC may also be referred to herein as a cloud-engine where raw network traffic may be sent for identifying which type of device (e.g., device type and/or model) generated the traffic. In certain embodiments, various types of actions and/or activities can be conducted. For example, downloading of service classification whitelists, downloading of non-blockable domain lists, posting of service usage data, obtaining of domain name reputation data, and/or other actions can be performed utilizing the customer cloud 925, the SAM Cloud (e.g., ISP) 1602, and the SAM Core environment 1604. In certain embodiments, SAM Cloud 1602 and SAM Cloud 1002 can be the same cloud network, however, in certain embodiments, SAM Cloud 1602 and SAM Cloud 1002 can be separate clouds that can communicate and interact with each other.

Figure 17:
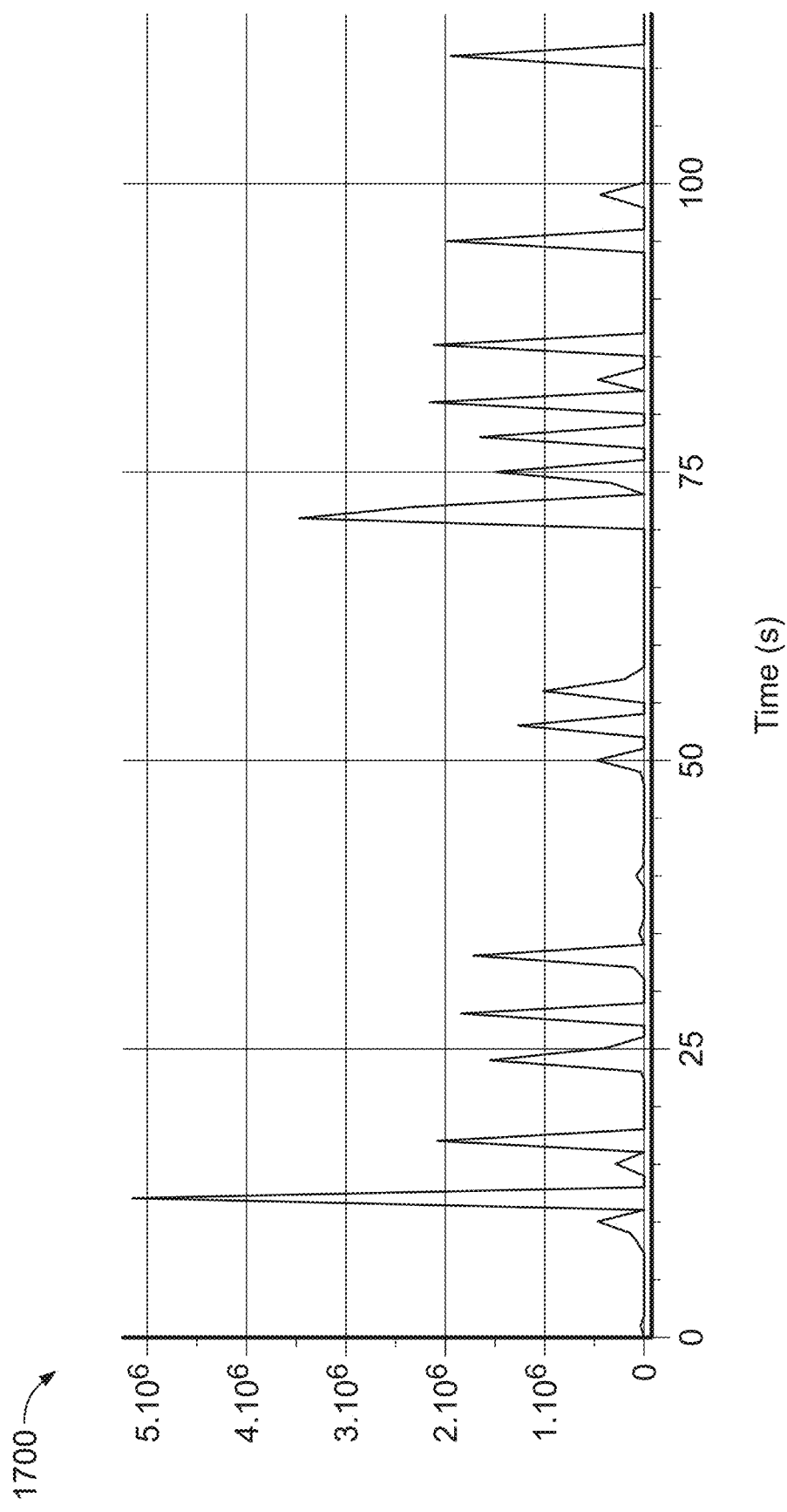
FIG. 17 is a graph plotting bytes per second versus time in a time series in accordance with embodiments of the present disclosure.

FIG. 17 is a graph 1700 plotting bytes/sec versus time in a time series in accordance with one or more embodiments of the present disclosure. The graph shows an example of the Netflow per a media session (e.g., "Youtube" session). Netflow, for example, can be the amount of traffic per period of time for a media session, which may be expressed as bytes/second. Pattern recognition of the time series of FIG. 17 may be used to classify the service in the Service identification software.

Figure 18:
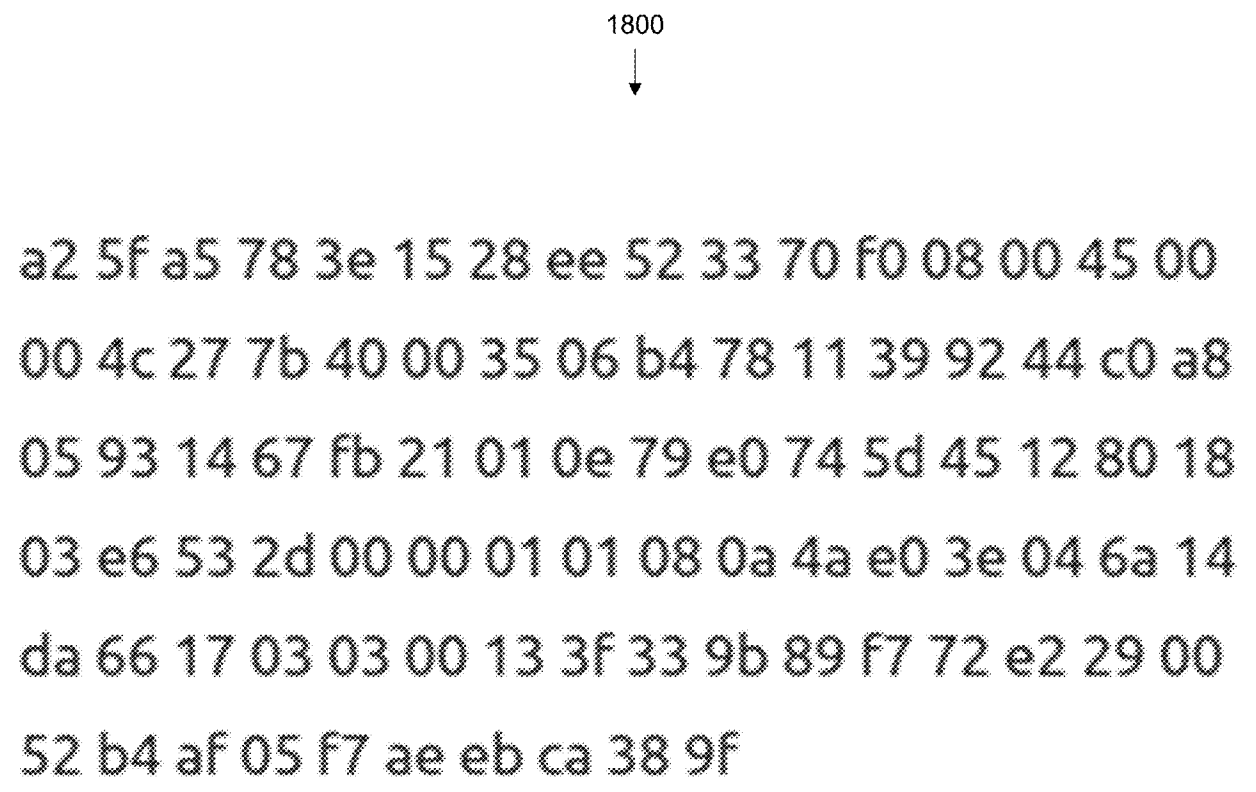

FIG. 18 is an exemplary embodiment of an encrypted payload 1800 for a TLSv1.2 packet in accordance with one or more embodiments of the present disclosure.

In some embodiments, the payload of the data packets in the data traffic may be encrypted, which may prevent the use of the techniques previously described hereinabove based on the usage of Domain Name System (DNS), Server Name Indication (SNI), and content delivery network (CDN) for classifying the service from the unencrypted data traffic. This encryption may be generated from the use of Transport Layer Security (TLS) and/or User Datagram Protocol (UDP).

In some embodiments, different algorithms may be used to analyze the encrypted data traffic to classify the services from the encrypted data traffic. However, these techniques may be dependent on the connection quality as shown below in FIGS. 20 and 21 decreasing the classification accuracy.

Figure 19:
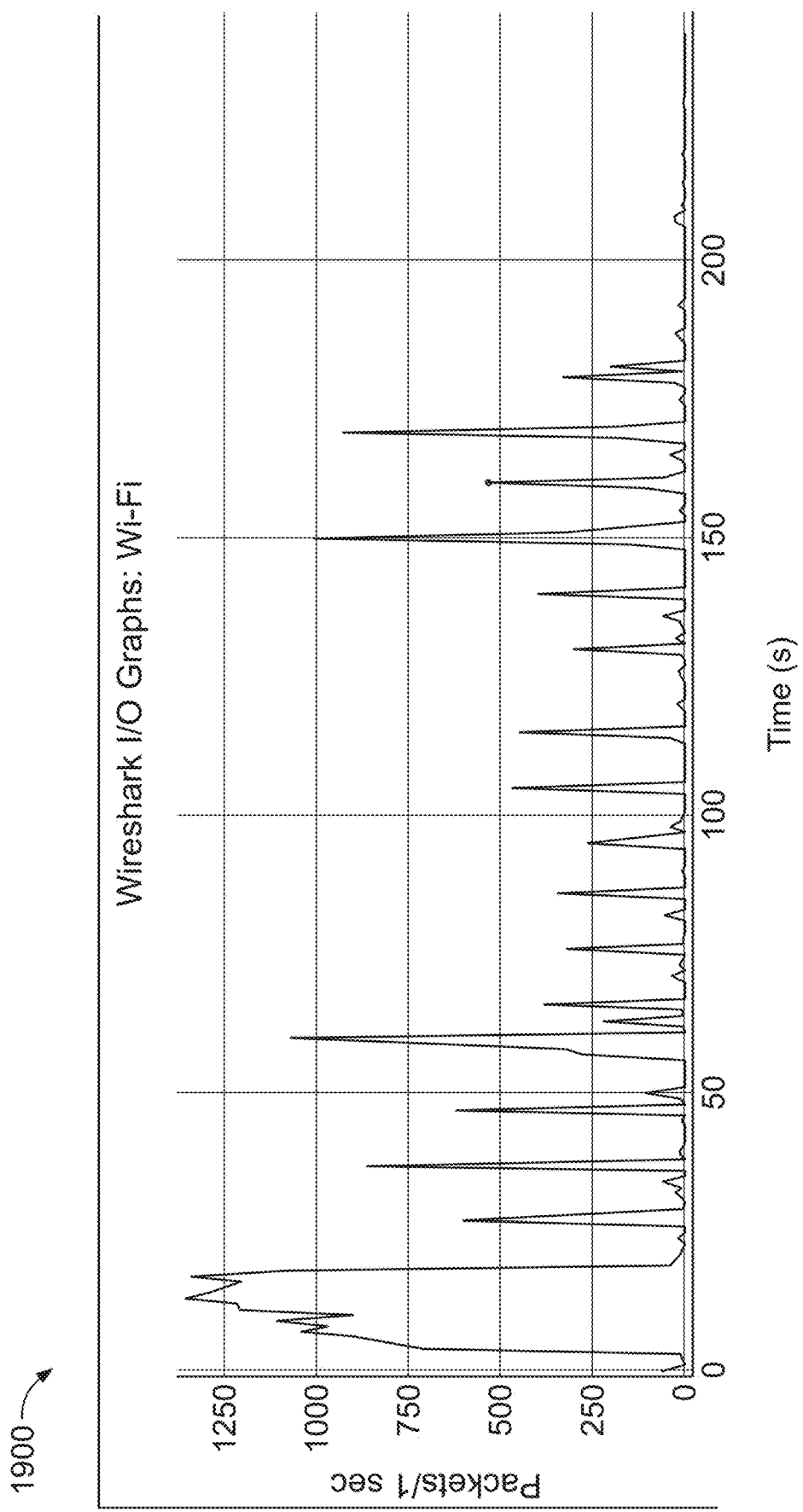
FIG. 19 is a graph plotting bytes per second versus time in a time series of a media clip received by a high-quality WiFi network in accordance with embodiments of the present disclosure.

FIG. 19 is a graph 1900 plotting bytes/sec versus time in a time series of a media clip (e.g., Youtube clip) received by a high-quality WiFi network in accordance with one or more embodiments of the present disclosure.

Figure 20:
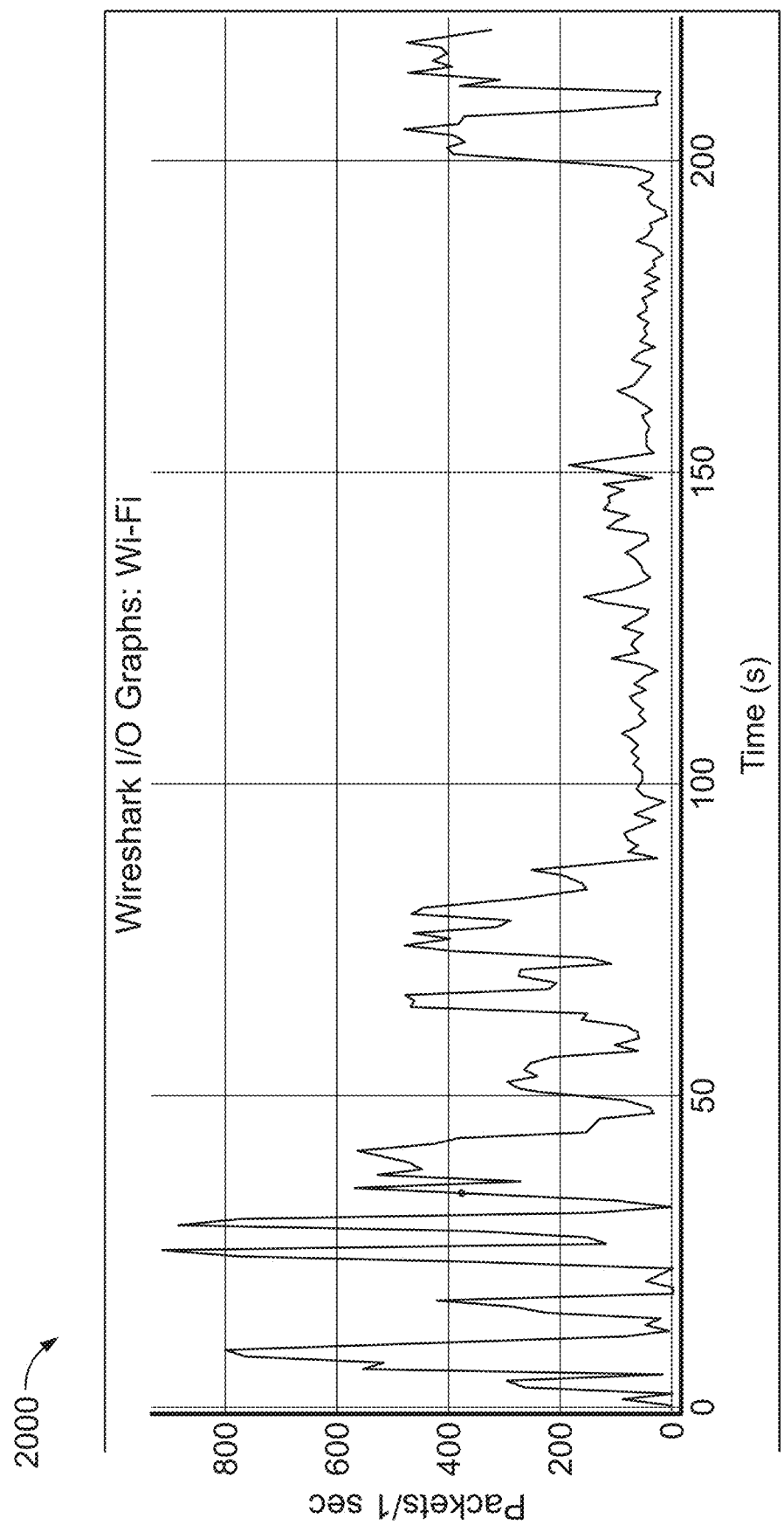
FIG. 20 is a graph plotting bytes per second versus time in a time series of the same media clip of FIG. 19 received by a poor-quality WiFi network in accordance with embodiments of the present disclosure.

FIG. 20 is a graph 2000 plotting bytes/sec versus time in a time series of the same media clip (e.g., Youtube clip) of FIG. 19 received by a poor-quality WiFi network in accordance with one or more embodiments of the present disclosure.

In some embodiments, a classification model based on machine learning may be trained to match these patterns per service category (streaming, browsing, gaming, etc. A classification model based on packet payload may have superior accuracy results. This model may be based on recognizing the encrypted bytes sent in the payload of TLS and UDP packets (data packets, after handshaking). These model results may be independent of the WIFI strength signal as shown for example in FIGS. 19-20. This machine learning approach may also be trained to recognize a service (Youtube, Netflix . . . ) and not only a service category (streaming, browsing . . . ). The machine learning approach may be configured to use the data payload and no personal information from the header so as to provide customer privacy.

In some embodiments, in addition to customer cloud (e.g., ISP) engines that may be currently deployed in the cloud, the SAM cloud may need to implement another engine that processes the data when receiving the data usage from the agent and scaling up current services to support traffic and storage. In addition, product requirements may be used to predict networking, processing, and storage sizing, to create cost prediction and cost optimization based on:
1. https://{{gateway} }/v3/download/list-files/{{filetype} }/{{CRC32} }
   a. messages number per CPE/day estimation
2. https://{{gateway} }/v3/stats/service_usage_data
   a. messages number per CPE/day estimation
   b. messages number per device/service estimation
3. https://{{reputation-gateway}}/v3/reputation/query/{domain}
   a. messages number per CPE/day estimation
   b. messages number per device/service not in classification_defs estimation
4. Data storage, training, and processing—Amazon TimeStream, Amazon SageMaker In some embodiments, the service identification software may be an additional software module or an extension of a Security Agent software running on the networking device.

In some embodiments, the service identification software may an extension to cloud security services solutions for office, where a reputation gateway may be added to retrieve the domain reputation. The connection between the customer cloud and reputation gateway may be based on the same mechanism that is currently deployed and used for the customer cloud (e.g., ISP) gateway where the same security rules may be enforced for the current cluster and services.

In some embodiments, with regard to an agent implementation for test case and automation, the agent may execute a few services concurrently and may verify that the bytes sniffed match the byte count that the agent sent to the cloud per service. The database may be queried for the results that may be compared to the expected results. This embodiment represents how either a lab setup may be used for large scale automated testing, or in some cases, test and validate the system when it is live with users. An agent may generate simulated traffic and then validate that it was identified correctly with the right service ID, time, packets, etc.

In some embodiments, with regard to a cloud implementation for test case and automation, files may be downloaded and their content validated. An agent may be imitated by creating an agent mock, sending service usage buckets and validating the response, and getting services usage data and validating cloud counters, In some embodiments, additional capabilities of identifying services may be used in the service identification software agent with an option to view each capability's logs, usage, and errors over time. In addition, having query and aggregate capabilities according to each capability (fingerprint, serviceId) may enable the backend server to track degradation in services, and root causes of errors and decrease the time of solving urgent issues.

In some embodiments, the service ID software agent deployed on a plurality of network devices in a network may be controlled by agent control software operating on the backend servers and described hereinbelow. Stated differently, the network devices may analyze the data traffic at a particular location and may send the analyzed data back to the backend. The agent control software may be configured to analyze the data from multiple networks and/or over different time intervals. Furthermore, the backend may send periodic updates such as daily updates to each of the service ID software agents on each of the network devices based on previous analyses (e.g., from one or more different days).

Figure 21:
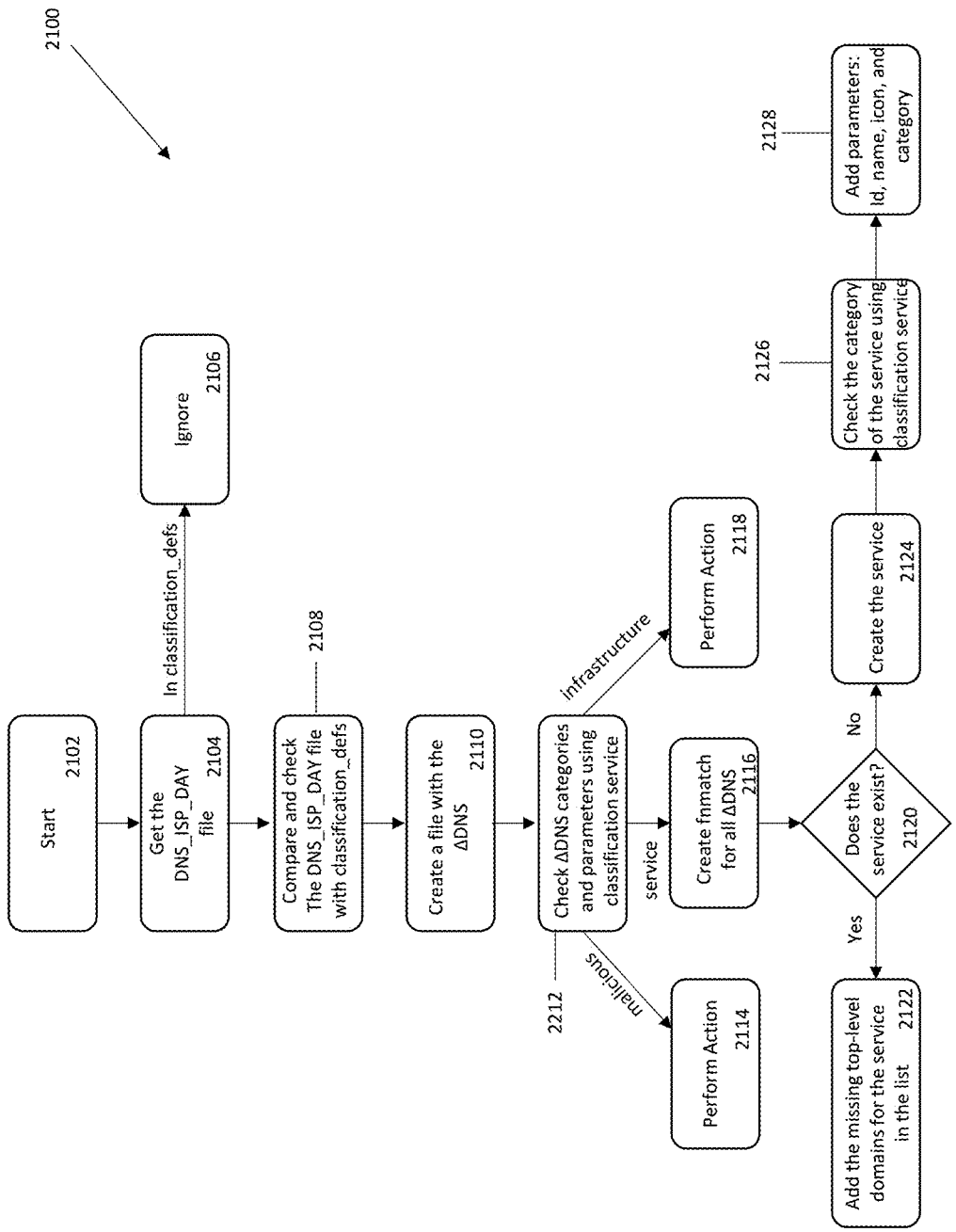
FIG. 21 is a flow chart diagram of the service identification software flow from the backend server in accordance with embodiments of the present disclosure.

FIG. 21 is a flow chart diagram of the service identification software flow 2200 from the backend server in accordance with one or more embodiments of the present disclosure. In certain embodiments, the backend server may control a plurality of service identification software agents running on a plurality of network devices (e.g., network equipment) in a network such as a customer cloud (e.g., an ISP) network. The backend server may be configured to map the services and services categories from the data retrieved from the data traffic through each network device in the ISP network based on the internet DNS.

In some embodiments, every service may include the following fields: (1) an identification ID—a unique number that may identify every service, (2) a Name—a name of the main service, (3) a uniform resource locator (URL)—a field that may include all of the main domains and subdomains of the main service, (4) content delivery network (CDN)—a field that may include all scripts, APIs, or any third party service that is being used by a service, (5) Icon—an icon of the service, and/or (6) category—category of the service.

In some embodiments, automation of the service as shown in FIG. 21, which may start at 2102, may be performed by software running on the backend server in the following steps:

1. A 2104, get the DNS_ISP_DAY file from the customer cloud (e.g., ISP), for example, that may include all the DNS that was used during a particular day. For example, the file can include a listing of all DNS requested in connection with one or more services and/or applications requested by computing devices interacting with a network device that may be controlled by an ISP.
2. At 2108, compare the DNS_ISP_DAY file with the classification_defs file (e.g., service identification list), which may be the main file where mapping the Service ID parameters from the day before. If the file is in the classification_defs file, the flow 2100 can ignore the file at 2106 The classification_defs file may be the DNS_ISP_DAY from the day before along with any further interpretations or data related to the processed DNS data from all previous days.
3. After comparing, at 2110, the flow 2100 can include create a file with the DNS (a file with the DNS that we didn't have in the classification_defs). This is for identifying new services from the data traffic over the plurality of networking devices.
4. At 2112, check the DNS categories and parameters with a 3rd party DNS reputation service (e.g., a classification service), such as, for example, Webroot and Virus Total, where a domain (URL) may be inputted and category and reputation of the URL may be outputted such as for example but not limited to streaming, computer infrastructure, news, ecommerce, etc. If the categories and/or parameters indicate that the domain names are malicious, the flow 2100 can proceed to step 2114, which can involve blocking the domains and/or initiating security measures. If the categories and/or parameters indicate that the domain names are associated with infrastructure, the flow 2100 can perform other actions at 2118, such as enabling a computing device to access a network time for synchronization purposes with the computing device. If, however, the categories and/or parameters are for services that are not infrastructure or malicious, the flow 2100 can proceed to 2116.
5. At 2116, the flow 2100 can include from DNS, create a service list and CDN list.
   The service list may include the main service domains. The CDN list may include all third parties, APIs, scripts, Ads, etc.
6. At 2116, the flow 2100 can include creating fnmatch for all DNS. The fnmatch may be a regular function expression that may be used to identify the top-level domain names in a list of domain names so as to reduce the quantity of redundant domain names in the DNS list.
7. The flow 2100 can then, at 2120, include determining if the service exists, such as in the service identification list. If the service exists, the software algorithm may add all the missing fnmatch top level domains for this service at 2122.
8. If the service doesn't exist, then, at 2124 the software algorithm may create the service at 2124, check the category of the service using a classification service (e.g., Webroot classification) at 2126, and add the following parameters: id (e.g., identification of the service), name (e.g., name of the service), icon (e.g., an icon representing the service), and category of the service at 2128.

In some embodiments, the category of every new URL may be divided into infrastructure and service where the infrastructure may refer to the platform such as a cellphone using a URL to check internet time for example.

In some embodiments, the services may further include the content delivery networks (CDNs). Internet content may be stored on multiple CDNs such as Akamai, for example. However, it may not by clear as to the type of content from the analysis of the URLs called by the user's computing device to request content. Hence the fnmatch may be used to reduce the URL content for the service ID software agents and backend servers to recognize the content of the called data so as to identify the service and/or service categories. That is, the redundant domains and/or subdomain URLs without the service and/or service category data may be removed by fnmatch to leave identifiable high or top-level domains associated with a service like Netflix, for example. Netflix may have content on server1.il.netflix.com or server2.il.netflix.com such that fnmatch would remove the server1.il and server2.il domain from the domain list and leave behind *.Netflix.com, for example. Thus, the full domain list may be reduced from 1000 URLs to 10-100 URLs for example making the service identification analysis more computationally efficient.

FIG. 22 illustrates a table 2200 showing data traffic versus unique domain count in accordance with one or more embodiments of the present disclosure. The table also illustrates a reduction in the number of domains using the fnmatch function.

In some embodiments, the service ID software agent may use a session associator software module such that when a customer opens a particular service like Netflix, for example, on a particular computing device communicating through a particular networking device running the service ID software agent, the service ID software agent may implement a timer from the time of the service opening trigger such that the service ID software agent identifies that the network activity may be associated with Netflix, for example, and all of its associated network and internet traffic such as $3^{rd}$ party content delivery networks, advertisement services, embedded video service and more. Thus, the networking device may detect via the networking connection provided to each computing device, their activities such as streaming, gaming, or downloading requiring certain bandwidth and/or latency priorities. This information may be used by the customer cloud (e.g., ISP), for example, to propose to a business to provide tailored premium services with appropriate bandwidth and/or latency metrics based on the detected customer's usage patterns. The proposal may be based on the plurality of output metrics previously discussed above based on the postprocessed data collected by the backend server generated by each of the deployed service ID software agents deployed in the networking devices in the customer cloude (e.g., ISP) network.

Figure 23:
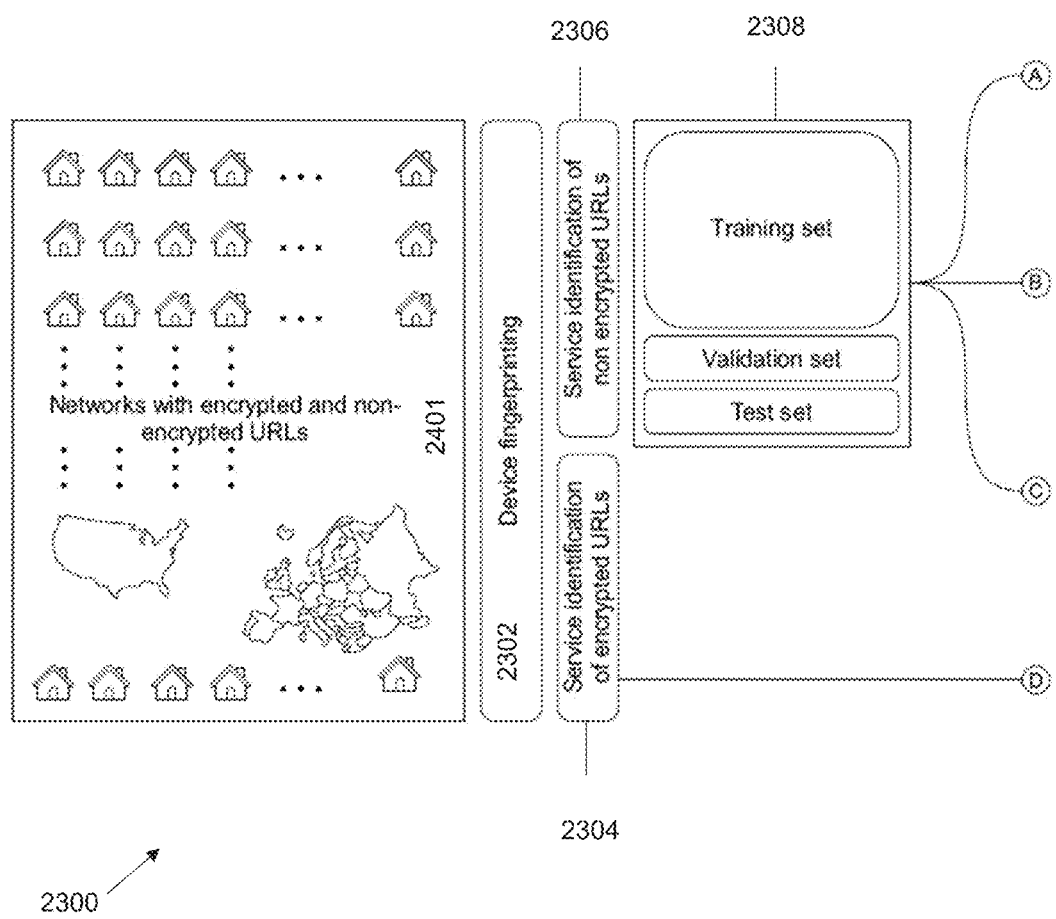
FIG. 23 is a block diagram illustrating a data flow for the identification of the general service categories without the collection of DNS data in accordance with embodiments of the present disclosure.
Figure 23:
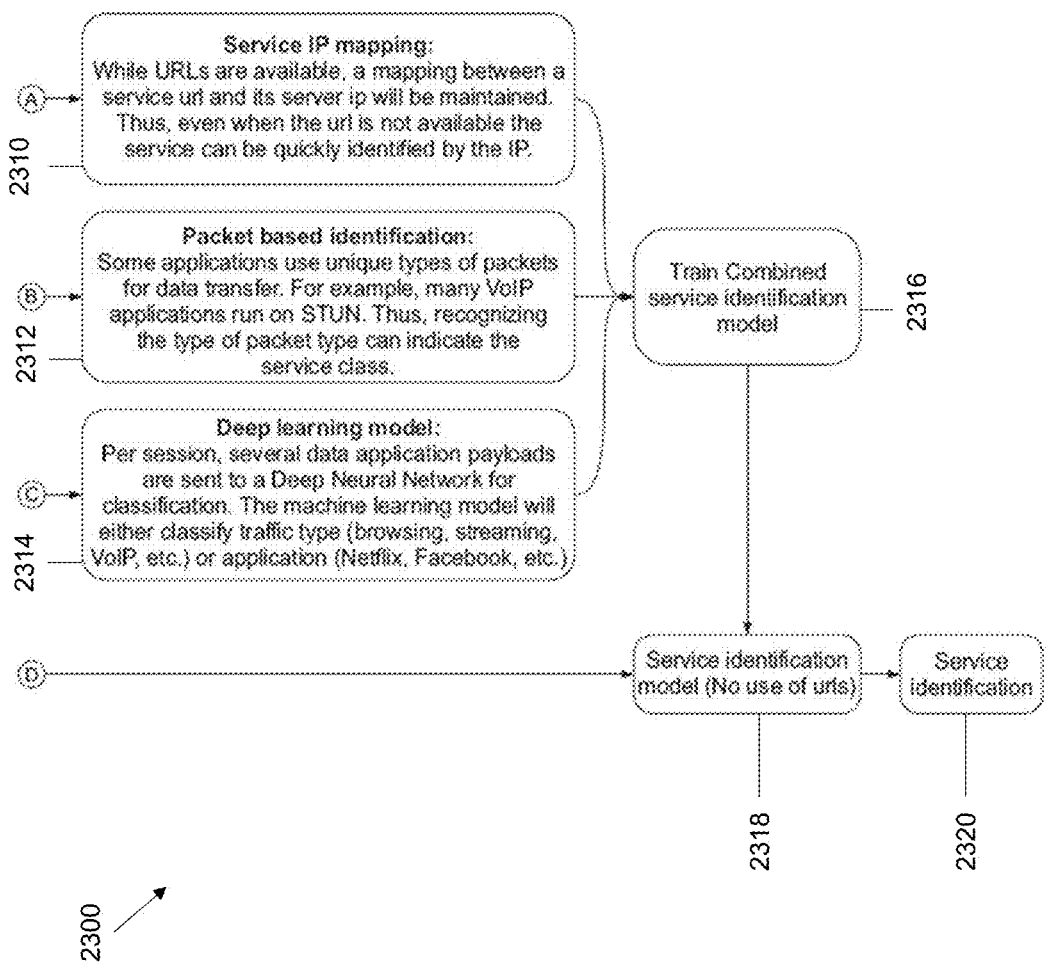

FIG. 23 is a block diagram illustrating a data flow 2300 for the identification of the general service categories without the collection of DNS data in accordance with one or more embodiments of the present disclosure. The backend server may execute a classification and/or sorting algorithm (e.g., machine learning model), such as, but not limited to, a Deep Neural Network, a Convolutional Neural Network (CNN) to classify the payload packets of each application into a service category, and/or other types of algorithms and/or models. In this case, the data packets in the received data traffic by the network device may be encrypted using different protocols such as TCP, UDP and/or QUIC. The encryption of data packets from each application does not produce patternless data. In the encrypted data, the data packets may include application-specific patterns based on the applications such as Netflix, Disney Plus, etc. that may be used by the CNN model. Thus, the CNN model may be trained to learn the encrypting features without decrypting the payloads.

In some embodiments, the application data payloads may be converted to a gray scale image for applying an image classification algorithm. For each TCP/UDP session (identified by its unique four tuples), handshaking packets may be disregarded, and the classification may be performed only on the application data packets, that is, the data packets that send the raw data of the application. Within these packets, all the headers (like ip) may be stripped to ensure that the personal data of the user (like MAC address, etc.) may be kept private. Thus, the model input data is a list of bytes (hex), as seen in the image of FIG. 18. In other embodiments, these may be converted to an integer between 0 and 255, as each byte has 256 possible combinations since the CNN model may use numbers as inputs.

In certain embodiments, the data flow 2300 can include, at 2301, analyzing network traffic for various computing devices being monitored by the system of the present disclosure. Based on analyzing the network traffic, device fingerprinting can be conducted at 2302, which can identify the type of computing devices associated with the network traffic (e.g., initiating DNS requests, requesting services, using network services, etc.). At 2304, the flow 2300 can include conducting service identification for URLs that are encrypted (e.g., DNS requests made by a computing device), and, at 2306, the flow 2300 can include conducting service identification for non-encrypted URLs. In certain embodiments, the various service identifications and information associated with the network traffic and fingerprinting can be utilized as inputs, at 2308, to a machine learning model, which can use the data for training sets, validation sets, and/or testing sets. At 2310, the flow 2300 can include conducting, such as by utilizing the machine learning model, service IP mapping. For example, while URLs are available, a mapping between a service URL and its server IP address can be maintained. Thus, even when the URL is not available, the service can be quickly identified by the IP address. At 2312, the flow 2300 can include conducting packet-based identification. In certain embodiments, certain applications can use unique types of packets for data transfer. For example, VOIP applications can run on STUN. Thus, the machine learning model can recognize the packet type, which can indicate the service class (e.g., the type of service) associated with the packet type. At 2314, a deep learning model can be utilized. For example, per session, several data application payloads can be sent to a deep neural network for classification. The machine learning model can classify the network traffic associated with the computing devices based on traffic type (e.g., browsing, streaming, VoIP, etc.) or by application (e.g., Netflix, Facebook, etc.). In certain embodiments, the information from 2310, 2312, and 2314 can be utilized to train, at 2316, a service identification model (i.e., machine learning model). At 2318, an updated service identification model can be provided that can identify services from network traffic without having to examiner URLs. At 2320, the trained/updated service identification model can identify services for various network traffic associated with (e.g., initiated, delivered, and/or requested) computing devices.

FIG. 24 illustrates a series of gray scale images 2400 converted from encrypted application data payloads for different services categories as inputs into a machine learning model in accordance with one or more embodiments of the present disclosure. The different service categories shown in FIG. 24 may include but are not limited to voice over internet protocol (VOIP), streaming and browsing. Different applications may employ different protocols, such as for example, Transmission Control Protocol (TCP), User Datagram Protocol (UDP) and/or Quick UDP Internet Connections (QUIC). This information may help the model converge to the right service category by the use of a marker as shown in the arrows of FIG. 24. Thus, to insert this data, and other data inputs, into the image being classified, five "pixels" at the location of the arrows have been added to the payload data to represent the specific protocol, as seen on the bottom right corner of each gray scale image. For example, 2402 shows a classification of VOIP, 2404 shows a classification for browsing, and 2406 shows another classification for VoIP.

In some embodiments, the outcome of the above process may be a 38×39 image, for example, where each pixel is a number between 0 and 255 representing the payload bytes, while the last 5 pixels at the arrows indicate the packet protocol (TCP/UDP/QUIC). This image may form the input data in the training datasets to train the CNN model. In certain embodiments, instead of or in addition to converting images from the application data payloads for different service categories, the systems of the present disclosure can also convert strings, audio content, augmented reality content, virtual reality content, and/or other types of media content from the application data payloads for the different service categories. The converted strings and/or other forms of content can also be utilized as inputs into the machine learning model and can be utilized to distinguish between different services and/or categories of services. In certain embodiments, any form of data can be converted (e.g., converted data) from the application data payloads for the different service categories and can be utilized to distinguish services and/or categories of services.

The trained machine learning model may map the payloads as inputs to the following output classes:
  Web (general browsing)
  Streaming Video (e.g. Netflix)
  Gaming (includes traditional multiplayer and cloud gaming)
  AR/VR usage
  VOIP
  File Transfers/downloads
  Live-Streaming (e.g., Facebook/Instagram live)
  Other (all else)

In some embodiments, after identifying the class, the model may be used again to further identify the specific application. For example, after identifying that the packet may be in the service category "streaming", for example, the machine learning model may be further used to determine a specific service such as "YouTube", "Netflix", "Tiktok", or others. However, this approach may be limited in identifying a specific service for the browsing class due to the large number of applications.

In some embodiments, to identify a session, several packets of each session may be sent. Increasing the number of packets sent for classification may increase the classification accuracy of the model. However, on the other hand, sending too many packets may interfere with the user's quality of experience. Thus, the number of packets sent per service may be a parameter that may be changed.

In some embodiments, the data traffic through a plurality of network devices in a network, each having the service ID software agent controlled by the backend server, may include both unencrypted and encrypted data payloads. Thus, the service ID software agent may be configured to provide the intelligent identification of the service and/or service category classification using both embodiments shown in FIGS. 21-24 for managing each of the unencrypted and encrypted data payloads.

In some embodiments, the vast amount of data collected by the service ID software agents monitoring data traffic through a plurality of networking devices in at least one service provider may provide large datasets for training machine learning models to perform any of the methods for the identification of the service and/or service categories, and to generate the plurality of output metrics based in part on the identification.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud network," "customer cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer/customer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In certain aspects, a system for providing intelligent identification of computing services and categories of services in use within a plurality of computing networks is provided. In certain aspects, the system can include a backend server configured to control one or more agents configured to perform operative functionality of the system. The system can include a network device in communication with the backend server that is configured to perform a variety of operations and functionality of the system. In certain aspects, for example, the network device can be configured to analyze, by utilizing the one or more agents, network traffic associated with one or more services requested by one or more devices in communication with the network device. In certain aspects, the network device can be configured to compare, by utilizing the one or more agents, the network traffic associated with the one or more services to a service identification list provided by the backend server. In certain aspects, the network device can be configured to determine, based on comparing the network traffic to the service identification list, a type of the one or more services, a category for the one or more services, or a combination thereof. In certain aspects, the network device can be configured to provide, by utilizing the one or more agents, an identification of the type of the one or more services, the category for the one or more services, or a combination thereof, to a service provider associated with the network device. The network device can be further configured to provide, via the service provider and to the one or more devices, network services corresponding to the type of the one or more services, the category for the one or more services, or a combination thereof.

In certain aspects, the network device can be further configured to compare the network traffic associated with the one or more services requested by the one or more devices to the service identification list by comparing first domain name service information associated with the network traffic to second domain name service information from the service identification list.

In certain aspects, the network device can be further configured to generate a digital file comprising an identification of delta domain names in the first domain name service information that are not in the second domain name service information of the service identification list.

In certain aspects, the network device can be further configured to identify one or more parameters for one or more services associated with the delta domain names.

In certain aspects, the network device can be further configured to identify a top-level domain associated with the delta domain names by executing a matching algorithm using the delta domain names.

In certain aspects, the network device can be further configured to, based on the one or more services associated with the delta domain names being determined to exist, add the delta domain names associated with the one or more services to the service identification list.

In certain aspects, the network device can be further configured to create, based on the one or more services associated with the delta domain names being determined to not exist, the one or more services to provide one or more created services for inclusion in the service identification list.

In certain aspects, the network device can be further configured to determine, by utilizing a classification service, one or more categories for the one or more created services.

In certain aspects, the network device can be further configured to generate a plurality of parameters for the one or more created services. The plurality of parameters, for example, can include a service identification, a name, a digital icon, and the at least one category for the one or more created services.

In certain aspects, the network device can be further configured to provide the plurality of parameters to the backend server to update the service identification list to include the one or more created services and the plurality of parameters.

In certain aspects, a network device for providing intelligent identification of computing services and categories of services in use within a plurality of computing networks is also provided. The network device can include a memory that stores instructions and a processor that is configured to execute the instructions to cause the processor to be configured to perform a variety of operations. In certain aspects, the processor can be configured to inspect, by utilizing one or more agents, network traffic associated with one or more services requested by one or more devices in communication with the network device. In certain aspects, the processor can be configured to compare, by utilizing the one or more agents, the network traffic associated with the one or more services to a service identification list provided by a backend server in communication with the network device. In certain aspects, the processor can be configured to determine, based on comparing the network traffic to the service identification list, a type of the one or more services, a category for the one or more services, or a combination thereof. In certain aspects, the processor can be configured to provide, by utilizing the one or more agents, an identification of the type of the one or more services, the category for the one or more services, or a combination thereof, to a service provider associated with the network device. In certain aspects, the network device can be configured to provision, via the service provider and to the one or more devices, network services corresponding to the type of the one or more services, the category for the one or more services, or a combination thereof.

In certain aspects, the processor can be further configured to identify a type of the one or more devices in communication with the network device that generated the network traffic.

In certain aspects, the processor can be further configured to determine one or more output metrics of the one or more services based on a pattern associated with data in the network traffic.

In certain aspects, the processor can be further configured to provide the one or more output metrics to a service provider to modify a parameter for the network services in accordance with the pattern.

In certain aspects, the processor can be further configured to identify the type of the one or more services, the category of the one or more services, or a combination thereof, based on a mapping of a pattern associated with data in the network traffic to the type of the one or more services, the category of the one or more services, or a combination thereof, provided by the service identification list.

In certain aspects, the processor can be further configured to identify the type of the one or more services, the category of the one or more services, or a combination thereof, based on examination of a packet payload of one or more packets associated with the network traffic.

In certain aspects, a method for providing intelligent identification of computing services and categories of services in use within a plurality of computing networks is also provided. In certain aspects, the method can include analyzing, by utilizing one or more agents executed based on instructions from a memory that are executed by a processor, network traffic associated with one or more services requested by one or more devices. In certain aspects, the method can include comparing, by utilizing the one or more agents, the network traffic associated with the one or more services to a service identification list. In certain aspects, the method can include determining, based on comparing the network traffic to the service identification list, a type of the one or more services, a category for the one or more services, or a combination thereof. In certain aspects, the method can include transmitting, by utilizing the one or more agents, an identification of the type of the one or more services, the category for the one or more services, or a combination thereof, to a service provider. In certain aspects, the method can include providing, via the service provider and to the one or more devices, network services corresponding to the type of the one or more services, the category for the one or more services, or a combination thereof.

In certain aspects, the method can include generating one or more images, one or more strings, and/or one or more converted data, converted from one or more encrypted data payloads associated with one or more data packets of the network traffic.

In certain aspects, the method can include determining the type of the one or more services, the category of the one or more services, or a combination thereof, based on a first pattern associated with the one or more images, the one or more strings, and/or one or more converted data matching a second pattern classified for the type, the category, or a combination thereof.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

We claim:

1. A system, comprising:
   a backend server configured to control at least one agent; and
   a network device in communication with the backend server;
   wherein the backend server is configured to:
   analyze, by utilizing the at least one agent on the network device, network traffic associated with at least one service requested by at least one device in communication with the network device;
   distinguish between a plurality of encrypted data packets and a plurality of unencrypted data packets in the network traffic;
   when a first portion of the network traffic comprises the plurality of unencrypted data packets:
   compare the plurality of unencrypted data packets in the network traffic associated with the at least one service to a service identification list;
   determine, based on comparing the plurality of unencrypted data packets of the network traffic to the service identification list, a first type of the at least one service, a first category for the at least one service, or a combination thereof, associated with the plurality of unencrypted data packets;
   when a second portion of the network traffic comprises the plurality of encrypted data packets:
   convert data payloads of the plurality of encrypted data packets respectively into a plurality of greyscale images;
   input the plurality of greyscale images into at least one machine learning model that is trained to:
   recognize data patterns in the plurality of encrypted data packets using pixel values associated with each of the plurality of greyscale images and
   determine, based on the data patterns, a second type of the at least one service, a second category for the at least one service, or any combination thereof, associated with the plurality of encrypted data packets;
   provide an identification of the first type of the at least one service, the second type of the at least one service, the first category for the at least one service, the second category for the at least one service, or any combination thereof, to a service provider associated with the network device; and
   provide, via the service provider and to the at least one device, network services corresponding to the first type of the at least one service, the second type of the at least one service, the first category for the at least one service, the second category for the at least one service, or any combination thereof.

2. The system of claim 1, wherein the network device is further configured to compare the network traffic associated with the at least one service requested by the at least one device to the service identification list by comparing first domain name service information associated with the network traffic to second domain name service information from the service identification list.

3. The system of claim 2, wherein the network device is further configured to generate a digital file comprising an identification of delta domain names in the first domain name service information that are not in the second domain name service information of the service identification list.

4. The system of claim 3, wherein the network device is further configured to determine whether at least one service associated with the delta domain names exists in the service identification list.

5. The system of claim 4, wherein the network device is further configured to create, based on the at least one service associated with the delta domain names being determined to not exist, the at least one service to provide at least one created service for inclusion in the service identification list.

6. The system of claim 5, wherein the network device is further configured to determine, by utilizing a classification service, at least one category for the at least one created service.

7. The system of claim 6, wherein the network device is further configured to generate a plurality of parameters for the at least one created service, wherein the plurality of parameters comprise a service identification, a name, a digital icon, and the at least one category for the at least one created service.

8. The system of claim 7, wherein the network device is further configured to provide the plurality of parameters to the backend server to update the service identification list to include the at least one created service and the plurality of parameters.

9. The system of claim 4, wherein the network device is further configured to, based on the at least one service associated with the delta domain names being determined to exist, add the delta domain names associated with the at least one service to the service identification list.

10. The system of claim 3, wherein the network device is further configured to identify at least one parameter for at least one service associated with the delta domain names.

11. The system of claim 3, wherein the network device is further configured to identify a top-level domain associated with the delta domain names by executing a matching algorithm using the delta domain names.

12. The system of claim 1, wherein the backend server is configured to distinguish between the plurality of encrypted data packets and the plurality of unencrypted data packets in the network traffic by identifying an encryption protocol from data packet headers.

13. A network device, comprising:
a memory that stores instructions; and
a processor that executes the instructions to cause the processor to be configured to:
    inspect, by utilizing at least one agent, network traffic associated with at least one service requested by at least one device in communication with the network device;
    distinguish between a plurality of encrypted data packets in a first portion of the network traffic and a plurality of unencrypted data packets in a second portion of the network traffic,
    determine, based on comparing the plurality of unencrypted data packets in the first portion to a service identification list, a first type of the at least one service, a first category for the at least one service, or a combination thereof associated with the plurality of unencrypted data packets in the first portion,
    use at least one machine learning model configured to identify data patterns in the plurality of encrypted data packets in the second portion of the network traffic, and determine a second type of the at least one service, a second category for the at least one service, or any combination thereof, associated with the plurality of encrypted data packets in the second portion;
    provide, by utilizing the at least one agent, an identification of the first type of the at least one service, the second type of the at least one service, the first category for the at least one service, the second category for the at least one service, or any combination thereof, to a service provider associated with the network device; and
    provision, via the service provider and to the at least one device, network services corresponding to the first type of the at least one service, the second type of the at least one service, the first category for the at least one service, the second category for the at least one service, or any combination thereof.

14. The network device of claim 13, wherein the processor is further configured to determine at least one output metric of the at least one service based on a pattern associated with data in the network traffic.

15. The network device of claim 14, wherein the processor is further configured to provide the at least one output metric to a service provider to modify a parameter for the network services in accordance with the pattern.

16. The network device of claim 13, wherein the processor is further configured to identify a type of the at least one device in communication with the network device that generated the network traffic.

17. A method, comprising:
analyzing, by a processor of a backend server utilizing at least one agent on a network device, network traffic associated with at least one service requested by at least one device;
distinguishing, by the processor, between a plurality of encrypted data packets and a plurality of unencrypted data packets in the network traffic;
when a first portion of the network traffic comprises the plurality of unencrypted data packets:
    comparing, by the processor, the plurality of unencrypted data packets in the network traffic associated with the at least one service to a service identification list;
    determining, by the processor, based on comparing the plurality of unencrypted data packets of the network traffic to the service identification list, a first type of the at least one service, a first category for the at least one service, or any combination thereof, associated with the plurality of unencrypted data packets;
when a second portion of the network traffic comprises the plurality of encrypted data packets:
    converting, by the processor, data payloads of the plurality of encrypted data packets respectively into a plurality of greyscale images;
    inputting, by the processor, the plurality of greyscale images into at least one machine learning model that is trained to:
        recognize data patterns in the plurality of encrypted data packets using pixel values associated with each of the plurality of greyscale images and
        determine, based on the data patterns, a second type of the at least one service, a second category for the at least one service, or any combination thereof, associated with the plurality of encrypted data packets;
providing, by the processor, an identification of the first type of the at least one service, the second type of the at least one service, the first category for the at least one service, the second category for the at least one service, or any combination thereof, to a service provider associated with the network device; and
providing, by the processor, via the service provider and to the at least one device, network services corresponding to the first type of the at least one service, the second type of the at least one service, the first category for the at least one service, the second category for the at least one service, or any combination thereof.

18. The method of claim 17, further comprising generating, by the processor, at least one image, at least one string, at least one converted data, or any combination thereof, converted from at least one encrypted data payload associated with at least one data packet from the second portion of the network traffic.

19. The method of claim 17, wherein the distinguishing between the plurality of encrypted data packets and the plurality of unencrypted data packets in the network traffic comprises identifying an encryption protocol from data packet headers.

* * * * *